(12) United States Patent
Davis et al.

(10) Patent No.: US 12,223,020 B2
(45) Date of Patent: *Feb. 11, 2025

(54) BIOMETRIC ACCOUNT CARD

(71) Applicant: Lenovo (Singapore) Pte. Ltd., Singapore (SG)

(72) Inventors: Mark Charles Davis, Durham, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,770

(22) Filed: Dec. 24, 2018

(65) Prior Publication Data

US 2019/0370446 A1    Dec. 5, 2019

Related U.S. Application Data

(63) Continuation of application No. 14/172,416, filed on Feb. 4, 2014, now Pat. No. 10,162,954.

(51) Int. Cl.
| | |
|---|---|
| *G06Q 20/34* | (2012.01) |
| *G06F 21/32* | (2013.01) |
| *G06Q 20/36* | (2012.01) |
| *G06Q 20/40* | (2012.01) |
| *G07F 7/08* | (2006.01) |

(Continued)

(52) U.S. Cl.
CPC ........... *G06F 21/32* (2013.01); *G06Q 20/341* (2013.01); *G06Q 20/347* (2013.01); *G06Q 20/352* (2013.01); *G06Q 20/3674* (2013.01); *G06Q 20/40145* (2013.01); *G07F 7/0826* (2013.01); *G07F 7/0846* (2013.01); *G07F 7/0853* (2013.01); *G07F 7/086* (2013.01); *G07F 7/1008* (2013.01); *G07F 7/1016* (2013.01); *H04L 9/00* (2013.01); *H04L 9/3252* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 7,594,611 B1 * | 9/2009 | Arrington, III | ....... | G07F 7/1008 235/487 |
| 8,851,370 B2 * | 10/2014 | DiMuro | ............... | G06Q 20/341 235/487 |

(Continued)

OTHER PUBLICATIONS

"Bitcoin: a Peer-to-Peer Electronic Cash System" written under the pseudonym of Satoshi Nakamoto, found at https://bitcoin.org/bitcoin.pdf and having Wayback Machine reference date mid-2010 (also attached).*

(Continued)

*Primary Examiner* — Hani M Kazimi
(74) *Attorney, Agent, or Firm* — Brian J. Pangrle

(57) ABSTRACT

A card can include a processor; memory accessible to the processor; and instructions stored in the memory and executable by the processor to: decrypt a private key of a payor stored in memory of the card, where the private key is associated with digital cryptocurrency; use the decrypted private key to generate a signed message to transfer the digital cryptocurrency to an address of a payee; and output the signed message.

19 Claims, 16 Drawing Sheets

(51) Int. Cl.
*G07F 7/10* (2006.01)
*H04L 9/00* (2022.01)
*H04L 9/32* (2006.01)

(56) References Cited

U.S. PATENT DOCUMENTS

| | | | | |
|---|---|---|---|---|
| 10,026,078 | B1* | 7/2018 | Nolan | G06Q 20/3572 |
| 10,269,009 | B1* | 4/2019 | Winklevoss | G06Q 20/105 |
| 10,992,480 | B2* | 4/2021 | Ward | H04L 9/32 |
| 2002/0095586 | A1* | 7/2002 | Doyle | G06F 21/32 |
| | | | | 713/186 |
| 2002/0095587 | A1* | 7/2002 | Doyle | G07F 7/1008 |
| | | | | 713/186 |
| 2002/0186838 | A1* | 12/2002 | Brandys | H04L 9/3263 |
| | | | | 713/185 |
| 2012/0191977 | A1* | 7/2012 | Foster | H04L 9/3242 |
| | | | | 713/170 |
| 2013/0166455 | A1* | 6/2013 | Feigelson | H04L 9/3234 |
| | | | | 705/64 |
| 2016/0085955 | A1* | 3/2016 | Lerner | H04L 9/0869 |
| | | | | 726/20 |
| 2021/0211300 | A1* | 4/2021 | Ward | H04L 9/32 |

OTHER PUBLICATIONS

"P2P Transfer of Bitcoins Via Payment Card" by Alex Rolfe dated Jan. 15, 2014.*

"Bitcoin: a Peer-to-Peer Electronic Cash System" written under the pseudonym of Satoshi Nakamoto, found at https://bitcoin.org/bitcoin.pdf and having Wayback Machine reference date mid-2010 (also attached). (Year: 2010).*

"P2P Transfer of Bitcoins Via Payment Card" by Alex Rolfe dated Jan. 15, 2014 (Year: 2014).*

"P2P Transfer of Bitcoins Via Payment Card" (Smartmetric) by Alex Rolfe dated Jan. 15, 2014 (Year: 2014).*

"Bitcoin: a Peer-to-Peer Electronic Cash System" written under the pseudonym of Satoshi Nakamoto, found at https://bitcoin.org/bitcoin.pdf and having Wayback Machine reference date mid-2010. (Year: 2010).*

"How a Bitcoin Transaction Works" published on Feb. 1, 2014 by Coinico at the following hyperlink: http://www.coinico.com/blog/how-a-bitcoin-transaction-works. (Year: 2014).*

* cited by examiner

BIOMETRIC ACCOUNT CARD

RELATED APPLICATIONS

This application is a continuation of a U.S. patent application Ser. No. 14/172,416, filed 4 Feb. 2014, entitled "BIOMETRIC ACCOUNT CARD" (issued as U.S. Pat. No. 10,162,954 on 25 Dec. 2018), which incorporated by reference therein: a related, commonly assigned U.S. patent application Ser. No. 14/172,313, filed 4 Feb. 2014, entitled BIOMETRIC AUTHENTICATION STRIPE (issued as U.S. Pat. No. 9,697,342 on 4 Jul. 2017); and a related, commonly assigned U.S. patent application Ser. No. 14/172,343, filed 4 Feb. 2014, entitled BIOMETRIC AUTHENTICATION DISPLAY (issued as U.S. Pat. No. 9,489,502 on 8 Nov. 2016). The applications having Ser. Nos. 14/172,313 and 14/172,343, filed on 4 Feb. 2014, are incorporated by reference herein.

TECHNICAL FIELD

Subject matter disclosed herein generally relates to information storage devices technologies.

BACKGROUND

An information storage device such as, for example, a credit card may include a stripe that includes magnetic material that has been encoded with one or more tracks of information. As an example, such a card may be read by a reader for purposes of a financial transaction. As the information stored in the stripe is persistent, generally for years, a lost or stolen card may be used illicitly. Various technologies and techniques described herein pertain to information storage devices such as, for example, credit cards.

SUMMARY

An apparatus can include a display; memory that stores biometric information and account information for at least one account; a biometric sensor that senses biometric information; authentication circuitry that authenticates sensed biometric information at least in part via a comparison to stored biometric information; display circuitry that renders account information to the display responsive to authentication of sensed biometric information; selection circuitry that selects one of said at least one account associated with account information rendered to the display; and a field generator that generates an output session that outputs at least one magnetic field that represents account information for the selected one of said at least one account. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 4 is a diagram of an example of a method;

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
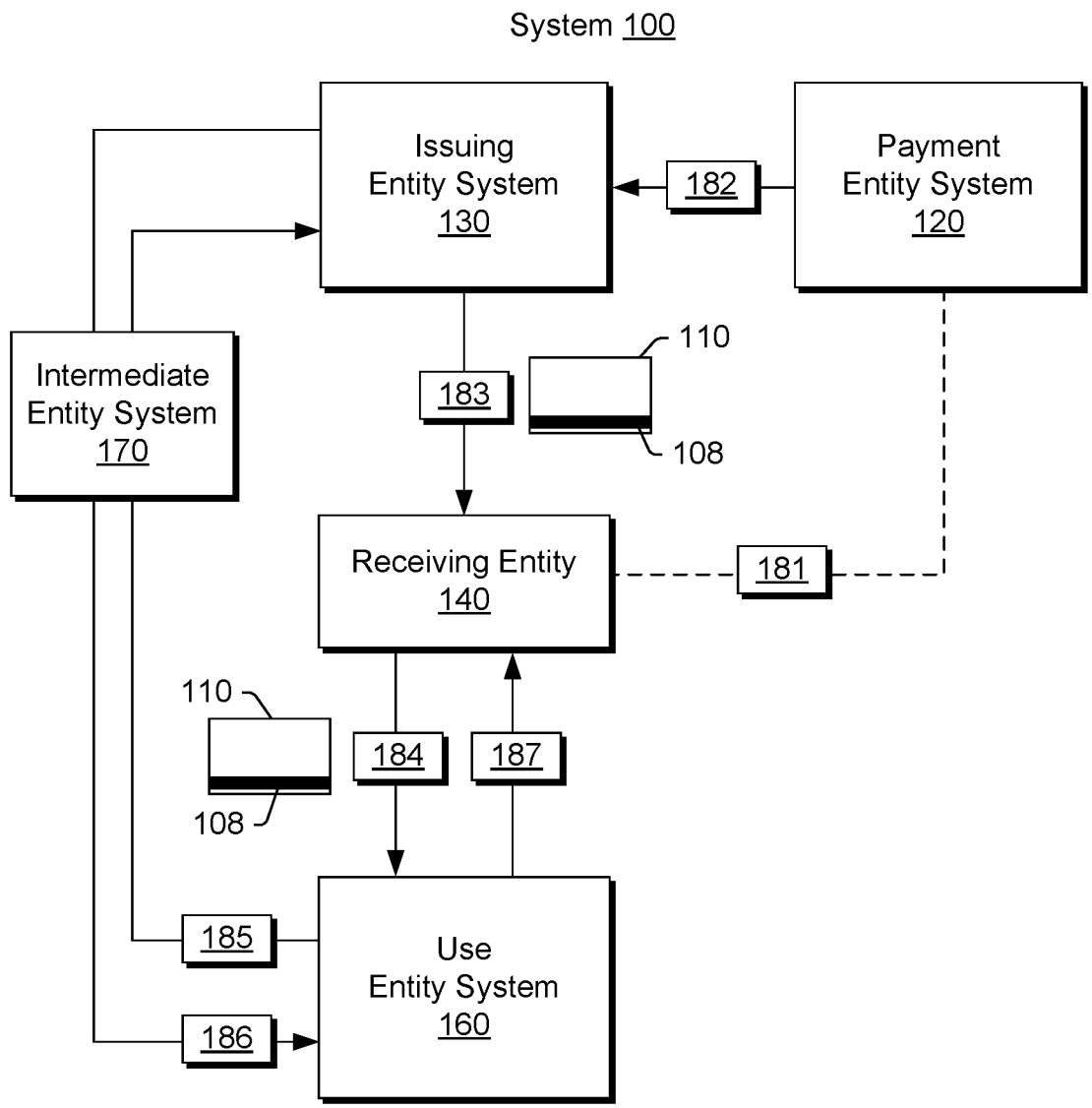
FIG. 1 is a diagram of an example of a system and an example of a method.
Figure 1:
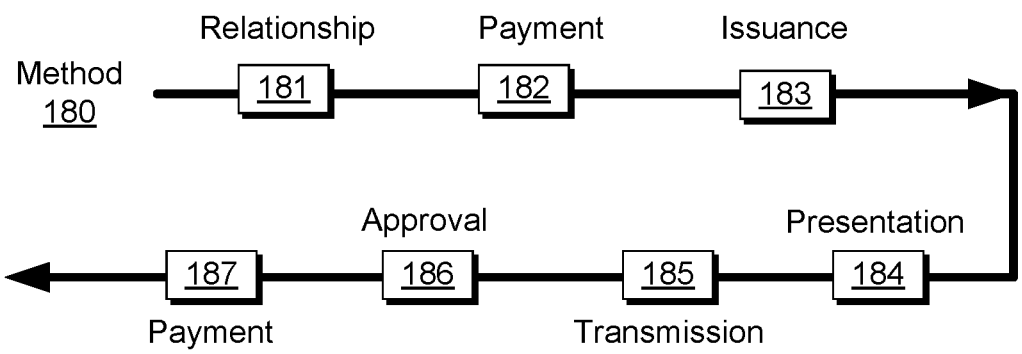

FIG. 1 shows an example of a system 100 and an example of a method 180 that may optionally be implemented using a system such as, for example, the system 100. In FIG. 1, the system 100 is shown with respect to information 108, which may be stored, as an example, on a card 110. For example, the card 110 may include a magnetic strip or stripe that includes magnetizable material (e.g., a metal oxide) that can have magnetic flux that represents at least a portion of the information 108. As an example, the card 110 may include printed and/or embossed characters, which may represent at least a portion of the information 108.

As an example, the information 108 may be presented in a readable form, for example, such as numeric form, alphanumeric form, symbolic form, character form, etc. As an example, the information 108 may include a number such as, for example, a multi-digit account number. As an example, the information 108 may include single-use account (SUA) information. A SUA may be part of an at least partially electronic, credit card-based payment solution. As an example, a SUA scheme may include a single 16-digit virtual account number for a particular payment where credit limit information may specific a payment amount. A SUA may be suitable for use for an account payable payment (e.g., AP payment), a real-time payment (e.g., for a warranty claim, a healthcare claim, a travel claim, a retail/catalog payment, etc.), or other type of payment.

Referring to FIG. 1, the system 100 includes a payment entity system 120, an issuing entity system 130, a receiving entity 140 (e.g., optionally a receiving entity system), a use entity system 160 and, optionally, an intermediate entity system 170 (e.g., an intermediary entity system). In the example of FIG. 1, an entity system may be or include an information handling system (IHS), which may include one or more processors, memory (e.g., an information storage device(s)), one or more network interfaces, etc. For example, information may be received and/or transmitted via one or more network interfaces, stored in memory and, for example, optionally processed by one or more processors. As an example, memory may be accessible by a processor, a network interface may be accessible by a processor, etc., for example, to communicate information, process information, etc.

In FIG. 1, the method 180 is shown as include a relationship block 181 for establishing a relationship between a payment entity and a receiving entity, a payment block 182 for making a payment from a payment entity to an issuing entity, an issuance block 183 for issuing information associated with the payment, a presentation block 184 for presenting the information to a use entity, a transmission block 185 for transmitting at least a portion of the information to the issuing entity (e.g., or an intermediate entity), an approval block 186 for approving at least a portion of the information and a payment block 187 for making a payment to the receiving entity based at least in part on an approval. As indicated in FIG. 1, the method 180 may optionally be implemented with respect to the system 100.

As an example, an intermediate entity may be an entity such as a financial services entity, which may optionally include an international network. For example, consider VISA® services or MasterCard® services, which are provided by entities that aim to facilitate electronic funds transfers (e.g., via branded credit cards and debit cards). An intermediate entity may provide a financial institution (e.g., an issuing entity) with "endorsed" payment products, which the financial institution may use to offer credit, debit, prepaid, cash-access programs, etc.

As an example, a method may commence when an entity submits a claim for goods and/or services and requests a SUA number that allows linking a payment to the entity and to an approved claim number. In such an example, such numbers may facilitate tracking, payment and reconciliation (e.g., transaction information may be automatically matched to pre-purchase information). A SUA may include information that places limits on a transaction, for example, a limit for amount, payment date range, merchant type, etc.

As an example, a SUA scheme may include transferring payment instructions from a payor's enterprise resource planning (ERP) system to a financial institution, transferring response information from the financial institution to the payor ERP system, transferring information from the financial institution to a payee, presenting at least a portion of the information to an intermediary (e.g., VISA®, MasterCard®, etc.), transferring information from the intermediary to the financial institution and transferring reconciliation information from the financial institution to the payor's ERP system. In such an example, the transferring information from the financial institution to a payee may be in the form of an electronic communication (e.g., an email, text message, etc.) or in the form of a card such as the card 110 of FIG. 1, for example, where the card is endorsed by the intermediary (e.g., a so-called VISA® card, MasterCard® card, etc.).

Figure 2:
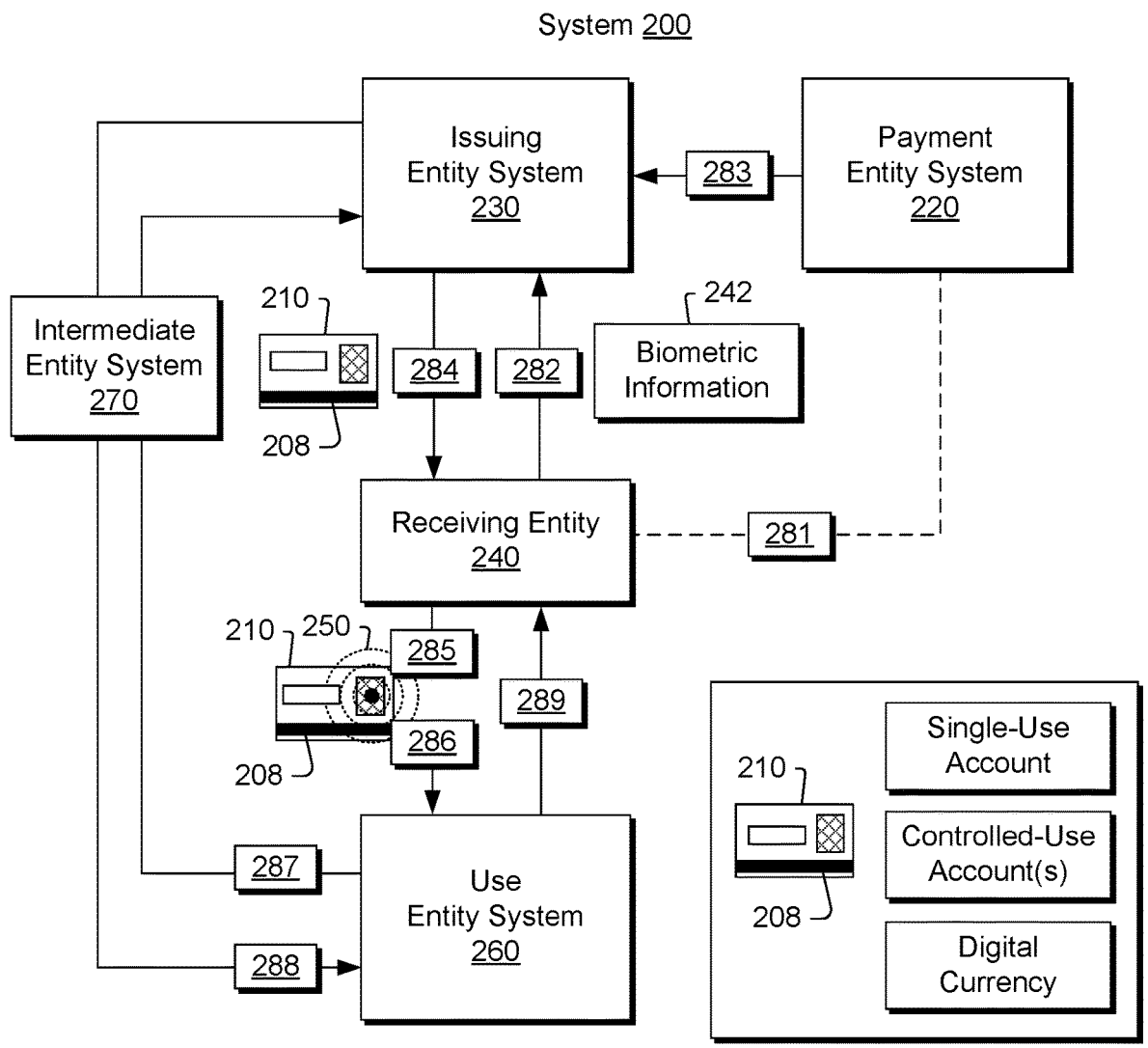
FIG. 2 is a diagram of an example of a system and an example of a method.
Figure 2:
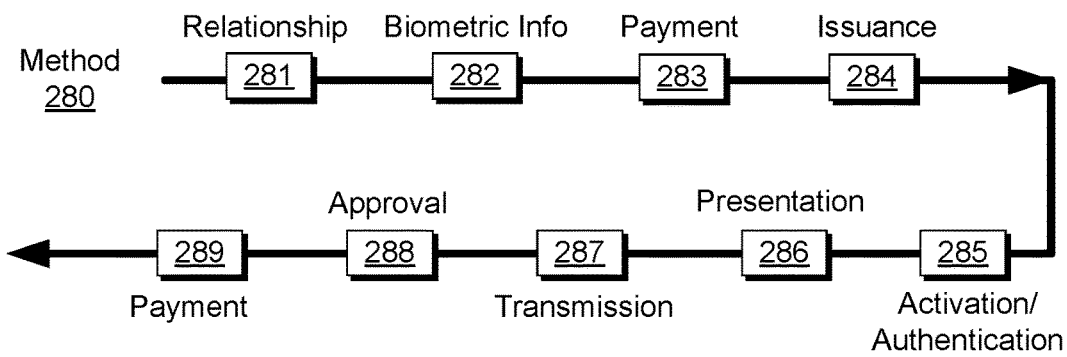

FIG. 2 shows an example of a system 200 and an example of a method 280 that may optionally be implemented using a system such as, for example, the system 200. In FIG. 2, the system 200 is shown with respect to information 208, which may be stored, as an example, on a card 210. For example, the card 210 may include a magnetic strip or stripe that includes magnetizable material (e.g., a metal oxide) that can have magnetic flux that represents at least a portion of the information 208, a display for displaying representations for at least a portion of the information 208, etc. In the example of FIG. 2, the card 210 also includes authentication circuitry 250 that may be configured to authenticate, for example, biometric information. In such an example, at least a portion of the information 208 may become available (e.g., via visual, tactile, magnetic and/or another mechanism) responsive to authentication of biometric information. Availability of information in such a manner may provide for initiating a transaction, furthering a transaction, etc.

In the example of FIG. 2, the information 208 may pertain to a SUA, a controlled-use account, controlled use accounts, digital currency or other type of information. As an example of digital currency, consider a cryptocurrency such as the Bitcoin currency. As an example, a cryptocurrency unit such as, for example, a bitcoin unit (BTC) may be a single-use account as, according to various standards, ownership may be transferred once (e.g., for a payor/payee transaction). As an example, while a BTC is mentioned, multiples of a BTC and fractions of a BTC may be considered a "unit" of digital currency (e.g., a bitcointon, a santoshi, etc.) the ownership of which may be transferred as a single-use account.

As an example, a digital currency transaction may occur as a payment sent or a payment received via circuitry. In such an example, a transaction may include transferring ownership of a digital currency unit from one address to another (e.g., consider Bitcoin addresses) and a transactions may be confirmed via network communications using a proof-of-work system (e.g., "mining"), in which blocks of transactions are appended to a shared public record (e.g., a block chain). For example, a transaction may include solving via circuitry a cryptographic problem before being able to append a block, which may be of an adjusted difficulty to meet a desired block creation rate.

The Bitcoin digital currency scheme can use an Elliptic Curve Digital Signature Algorithm (ECDSA) implementation of public-key cryptography, in which pairs of cryptographic keys, one public and one private, are generated; where a collection of keys may be referred to as a wallet. A Bitcoin digital currency transaction may transfer ownership of a digital currency unit (or units) to a new address (e.g., to that of a payee), which may be an alphanumeric string derived from public keys by application of a hash function and encoding. In such a scheme, corresponding private keys can act as a safeguard as a valid payment message from an address is specified to include the associated public key and a digital signature proving possession of the associated private key. As an entity possessing a private key can spend all of the bitcoins sent to a corresponding address, the essence of Bitcoin security is protection of private keys.

As an example, the card 210 of FIG. 2 may include information such as private key information where, for example, a digital signature may be generated to demonstrate possession of a private key. As an example, the card 210 may include a sensor that can sense biometric information and authentication circuitry that can authenticate sensed biometric information, optionally by a comparison to stored biometric information that may be stored in the card 210. Authentication circuitry may, as an example, allow for decryption of a stored private key for one or more purposes such as generating a digital signature.

As an example, the card 210 of FIG. 2 may be a digital currency card. As an example, the card 210 may be a SUA card. As an example, the card 210 may be a controlled-use account card, optionally for multiple accounts.

In FIG. 2, the system 200 includes a payment entity system 220, an issuing entity system 230, a receiving entity 240 (e.g., optionally a receiving entity system), a use entity system 260 and, optionally, an intermediate entity system 270 (e.g., an intermediary entity system). In the example of FIG. 2, an entity system may be or include an information handling system (IHS), which may include one or more processors, memory (e.g., an information storage device(s)), one or more network interfaces, etc. For example, information may be received and/or transmitted via one or more network interfaces, stored in memory and, for example, optionally processed by one or more processors. As an example, memory may be accessible by a processor, a network interface may be accessible by a processor, etc., for example, to communicate information, process information, etc.

In FIG. 2, the method 280 is shown as include a relationship block 281 for establishing a relationship between a payment entity and a receiving entity, a biometric information block 282 for transmitting biometric information to an issuing entity, a payment block 283 for making a payment from a payment entity to an issuing entity, an issuance block 284 for issuing information associated with the payment (e.g., as a physical entity that includes circuitry and optionally at least a portion of the biometric information), an activation block 285 for activating availability of at least a portion of the information, a presentation block 286 for presenting the information to a use entity (e.g., via a mechanism), a transmission block 287 for transmitting at least a portion of the information to the issuing entity (e.g., or an intermediate entity), an approval block 288 for approving at least a portion of the information and a payment block 289 for making a payment to the receiving entity based at least in part on an approval. As indicated in FIG. 2, the method 280 may optionally be implemented with respect to the system 200.

In the method 280, the biometric information block 282 for transmitting biometric information to an issuing entity may embed at least a portion of the biometric information (e.g., optionally as processed information) in a physical device such as, for example, the card 210. In such an example, the issuance block 284 for issuing information associated with the payment may issue the physical device (e.g., as including information associated with payment and information derived from biometric information).

As an example, the biometric information 242 may optionally be transmitted in an encrypted form to an issuing entity, for example, where a code exists to decrypt the biometric information. As an example, a code may be received by a card via a sensor, for example, a fingerprint sensor that can sense a fingerprint and additional input such as a touch sequence. In such an example, a user may touch the fingerprint sensor a predetermined number of times within a time period where the number corresponds to a code to decrypt the biometric information stored in the card for use in authenticating the user's fingerprint. Such an approach may provide a modicum of protection for the transmission of biometric information to the issuing entity in that the issuing entity may not know (e.g., may not need to know) the code (e.g., optionally entered via a dot/dash touch sequence of short and long duration touches, for example, as in Morse code).

As an example, a user may be provided with a card that includes a sensor where the user may input biometric information using the sensor and the user may then send the card to an issuing entity for encoding of additional information. As an example, an issuing entity may optionally issue information via a network to a user device such that the user can download the information for storage to a card that includes biometric information entered by the user. In such an example, referring to the system 200, the biometric information 242 may remain with the receiving entity 240 (e.g., where the block 282 of the method 280 may operate locally with respect to a receiving entity).

As an example, the card 210 of FIG. 2 may include memory that stores information, a fingerprint sensor and a microcontroller operatively coupled to the fingerprint sensor and to the memory. As an example, the card 210 may include one or more account numbers (e.g., optionally temporally restricted) as stored information. In such an example, a user (e.g., a receiving entity) may use the fingerprint sensor to input biometric information to thereby "unlock" at least a portion of the information card (e.g., to activate the card). Such a card may also include a control that can receive user input for selection of one of a plurality of account numbers.

As an example, an apparatus may include a display; memory that stores biometric information and single-use account information for at least one single-use account; a biometric sensor that senses biometric information; authentication circuitry that authenticates sensed biometric information at least in part via a comparison to stored biometric information; display circuitry that renders single-use account information to the display responsive to authentication of sensed biometric information; selection circuitry that selects one of said at least one single-use account associated with single-use account information rendered to the display; and a field generator that generates an output session that outputs at least one magnetic field that represents single-use account information for the selected one of said at least one single-use account. As an example, such an apparatus may be a card (e.g., formed as a card, have a card form factor, etc.). As an example, a form factor may be specified according to a standard, for example, consider an ISO standard such as ID-1 which specifies dimensions for a card form factor of 85.60 mm by 53.98 mm by 0.76 mm. As an example, a card may have one or more dimensions, for example, consider a dimension of about 86 mm, a dimension of about 54 mm and/or a dimension of about 0.8 mm (e.g., about a millimeter). As an example, a form factor for an apparatus may include a thickness in a range from about 0.3 mm to about 3 mm (e.g., or more).

As an example, an apparatus may include memory that stores biometric information and account information associated with at least one account; a sensor that senses biometric information; authentication circuitry that authenticates sensed biometric information via a comparison to stored biometric information; a field generator that generates an output session that outputs at least one magnetic field based at least in part on the account information responsive to authentication of sensed biometric information; and restriction circuitry that restricts the field generator to one output session per account. As an example, such an apparatus may be a card (e.g., formed as a card, have a card form factor, etc.).

As an example, a method may include sensing biometric information via a sense window of an apparatus; authenticating the biometric information with respect to an identity; and outputting account information (e.g., SUA information, digital currency information, etc.) associated with the identity. As an example, the apparatus may be a card (e.g., formed as a card, have a card form factor, etc.). As an example, a window of an apparatus may be an emissions window that emits at least one magnetic field that represents account information (e.g., SUA information, digital currency information, etc.). As an example, a window of an apparatus may be an emissions window that emits account information (e.g., SUA information, digital currency information, etc.) as a magnetic field via a window.

Figure 3:
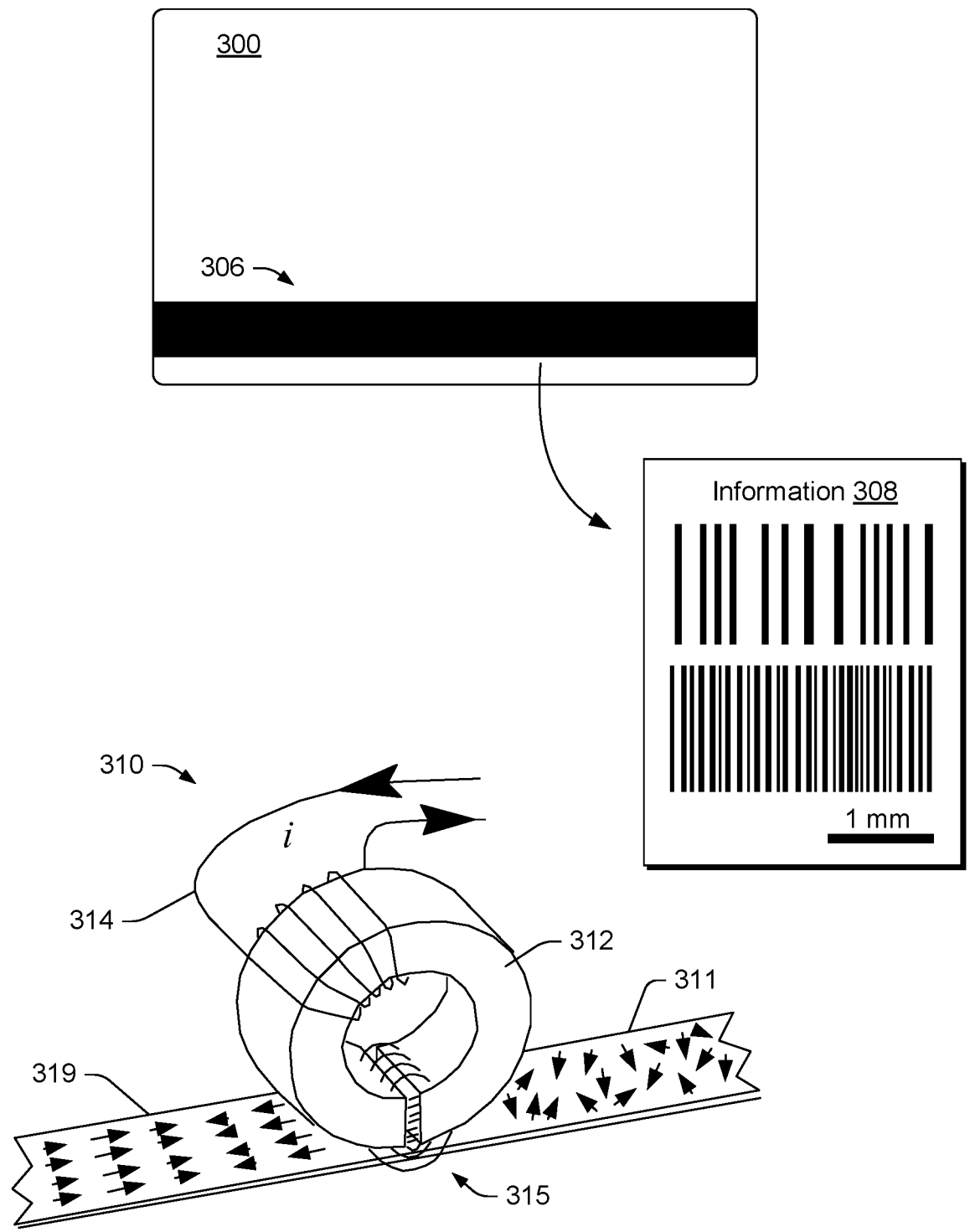
FIG. 3 is a diagram of examples of a card, information stored thereon and a field generator.

FIG. 3 shows an example of a card 300 that includes magnetic material 306 for storing information 308 (e.g., the card 300 may be referred to as an information storage device). The magnetic material 306 may be characterized in part by a property known as coercivity, which may be in units such as oersteds (Oe). In CGS, the unit of H-field is the oersted (Oe) and the unit of B-field is the gauss (G). In the SI system, ampere per meter (A/m) is used for H-field and tesla (T) is used for B-field. As to CGS to SI conversion, an oersted (Oe) is about 80 ampere per meter (A/m). As units of oersteds (Oe) may be used to characterize, specify, etc. magnetizing field strength, they are related to magnetomotive force (mmf) of current, for example, consider mmf of current in a single-winding wire-loop.

As an example, an H-field may be viewed akin to an electric field E, which starts at a positive electric charge and ends at a negative electric charge. For example, near a north pole lines of an H-field point outwardly while near a south pole lines of an H-field point inwardly (e.g., toward the south pole). A north pole (N) may experience force in a direction of an H-field while force experienced by a south pole (S) may be in a direction opposite to the H-field. In a magnetic pole model, the elementary magnetic dipole (m) may be formed by two opposite magnetic poles of pole strength ($q_m$) separated by a distance vector (d), for example, such that $m=q_m d$.

In the example of FIG. 3, coercivity may define one or more magnetic field properties for encoding, erasing, etc. information in the magnetic material 306. As an example, a low coercivity material may be rated at about 300 Oe while high coercivity material may be rated at about 1,250 Oe or more. As an example, a bank card such as, for example, a credit card or debit card, may include magnetic material rated at about 2,750 Oe. As an example, a card may be provided with a magnetic material such as iron oxide, barium ferrite or other magnetic material.

As an example, a slurry may be formed that is loaded with an amount of magnetic material and, for example, an amount of binder. Such a slurry may be coated onto a substrate such as a card.

FIG. 3 also shows an assembly 310 that includes a core 312 and a coil 314 for encoding information onto magnetic material 111 to produce encoded magnetic material 319. As shown, the core 312 includes a gap such that current carried by the coil 314 causes the core 312 to generate a magnetic field 315. The generated magnetic field 315 can cause magnetic material 311 to align in a manner that represents information to produce encoded magnetic material 319.

As an example, a core may be made of a metallic material upon which turns of wire are wound to form a magnetic read and/or write head. As shown in FIG. 3, the core 312 has a "C" shape. The gap of the core 312, across which magnetic lines of flux exist, may include a gap distance, for example, in a range of about 12 microns to about 50 microns. As an example, a gap may include a gap width (e.g., orthogonal to a gap distance). For example, a gap width may determine width of an encoded track on a magnetic stripe. As an example, a gap width may be specified according to one or more ISO standards. For example, a gap width may be in a range from about 2.5 mm to about 3.2 mm or more.

As an example, the coil 314 may carry current of the order of about 1 mA to about 2500 mA or more such that the core 312 acts as a magnetic head that can encode information in the magnetic material 311. As an example, a write head may employ write currents in a range from about 5 mA to about 100 mA peak-to-peak for a low coercivity magnetic material and, for example, about 100 mA to about 2500 mA peak-to-peak for a high coercivity material. As an example, a write current may depend on a number of turns in a winding (e.g., inductance), core material, etc.

As an example, a method may include encoding information in magnetic material, for example, as in magnetic material that is bound to or otherwise carried by a substrate such as a card (e.g., a card made of plastic and/or other material). As an example, a magnetic recording head may be used to encode or write information in magnetic material, which may be provided as a stripe. For example, alternating current may be carried by a coil about a core such that the core acts as a head that produces alternating zones of north-south and south-north magnetization. Such zones may represent bits of information. In the example of FIG. 3, the information 308 is illustrated as tracks of information stored in magnetic material (e.g., a magnetic medium).

As an example, a card may include one or more tracks of information, for example, that may conform to one or more standards (e.g., consider ISO standards). As an example, a track may include an end sentinel, for example, a character encoded on a magnetic stripe just after particular information (e.g., account information, etc.,) and just before a longitudinal redundancy check (LRC) character. As an example, an ISO standard may specify tracks where, for example, for tracks 2 and 3, the end sentinel is 11111 and where, for example, for track 1, the end sentinel is 111110. Such information may be direction, for example, from left to right.

A characteristic known as remanance may define the extent to which magnetic material remains magnetized after removal of a saturating magnetic field. As an example, remaining magnetic field encoded in magnetic material may be referred to as residual magnetization. As an example, a higher remanance may yield a higher amplitude encoded signal than a lower remanance. As an example, factors such as remanance, loading and thickness of magnetic material (e.g., as a layer) may determine signal amplitude of residual magnetization.

As an example, information may be encoded and defined in part by resolution. Resolution may be defined as a measure of signal amplitude of magnetic material at a higher density versus signal amplitude at a lower density. As an example, resolution may be determined by dividing amplitude at a high density by amplitude at a lower density, for example, to yield a resolution factor from about 0 to about 1.

As an example, an inflection point may be defined as a spot near an x-axis on a magnetic signal waveform where a curve changes direction. Inflection points may be present for digital information (e.g., binary 1s and 0s) at about 3 bits per mm to about 8 bits per mm (e.g., or more). More pronounced evidence of inflection points may be an indicator of higher resolution. As an example, a magnetic stripe of a card may be characterized in part by a spatial bit density that is a linear density that may correspond to an inflection point density. For example, a magnetic stripe of a card may be characterized by a spatial bit density in a range from about 3 bits per mm (e.g., about 30 bits per cm) to about 8 bits per mm (e.g., about 80 bits per cm). As an example, the spatial bit density may differ over the length of a magnetic stripe. As an example, bits may be encoded to represent characters (e.g., alphanumeric characters, numeric characters, etc.). As an example, a character may be specified according to a bit-depth (e.g., 7-bit alphanumeric characters, 5-bit numeric characters, etc.).

As mentioned, a card may include one or more tracks of information. As an example, a reader may be configured to read a track or tracks. As an example, a track may be a standardized track. For example, an International Air Transportation Association (IATA) track is specified to be encoded at 210 bits per inch with a maximum data length of 79 characters (e.g., for encoding an 18 digit primary account number and up to 26 alphanumeric characters that may include a person's name). As another example, consider an American Bankers Association (ABA) track (e.g., for financial transactions), which may be specified to be encoded at 75 bits per inch with a maximum data length of 40 numeric characters (e.g., for encoding a 19 digit account number). As yet another example, consider a track that may be used by financial institutions to store an encrypted PIN code, country code, currency units, amount authorized, subsidiary account information, and other account restrictions. Such a track may be, for example, encoded at 210 bits per inch with a maximum data length of 107 numeric digits.

As mentioned, a card may include one or more tracks of information. As an example, a reader may be configured to read a track or tracks. For example, a reader may include a read head configured to read a track or tracks as a card is swiped past the read head (e.g., translated with respect to a read window or read windows of the read head). As to data rates, as an example, for a range of spatial bit densities from about 30 bits per cm to about 80 bits per cm and a range of "swipe speeds" from about 20 cm per second to about 50 cm per second, data rates may be in a range from about 600 bits per second to about 4000 bits per second.

Where information is encoded on a substrate such as a card and where the card is lost, stolen, "borrowed", etc., the information may be used illicitly (e.g., without authorization). For example, a lost credit card may be run through a reader to allow one to determine what information exists on the card (e.g., accounts, etc.). As another example, where a card is temporarily given to another, that person may swipe the card through a reader for a legitimate purpose and also swipe the card through a reader for an illegitimate purpose. For example, the person may have a reader for the purpose of stealing information.

As mentioned, a bank card may have a stripe with high coercivity magnetic material, for example, rated at about 2,750 Oe. High coercivity is beneficial to the card holder as the magnetic flux carried by the magnetic material may persist for years and be relatively stable even when exposed to stray fields (e.g., from household electronics, vehicles, etc.). Such a card may be considered to be persistent or in an always "on" state. In other words, bits of information may be persistently present as magnetic field inflection points encoded in magnetic material of a stripe of such a card.

Figure 4:
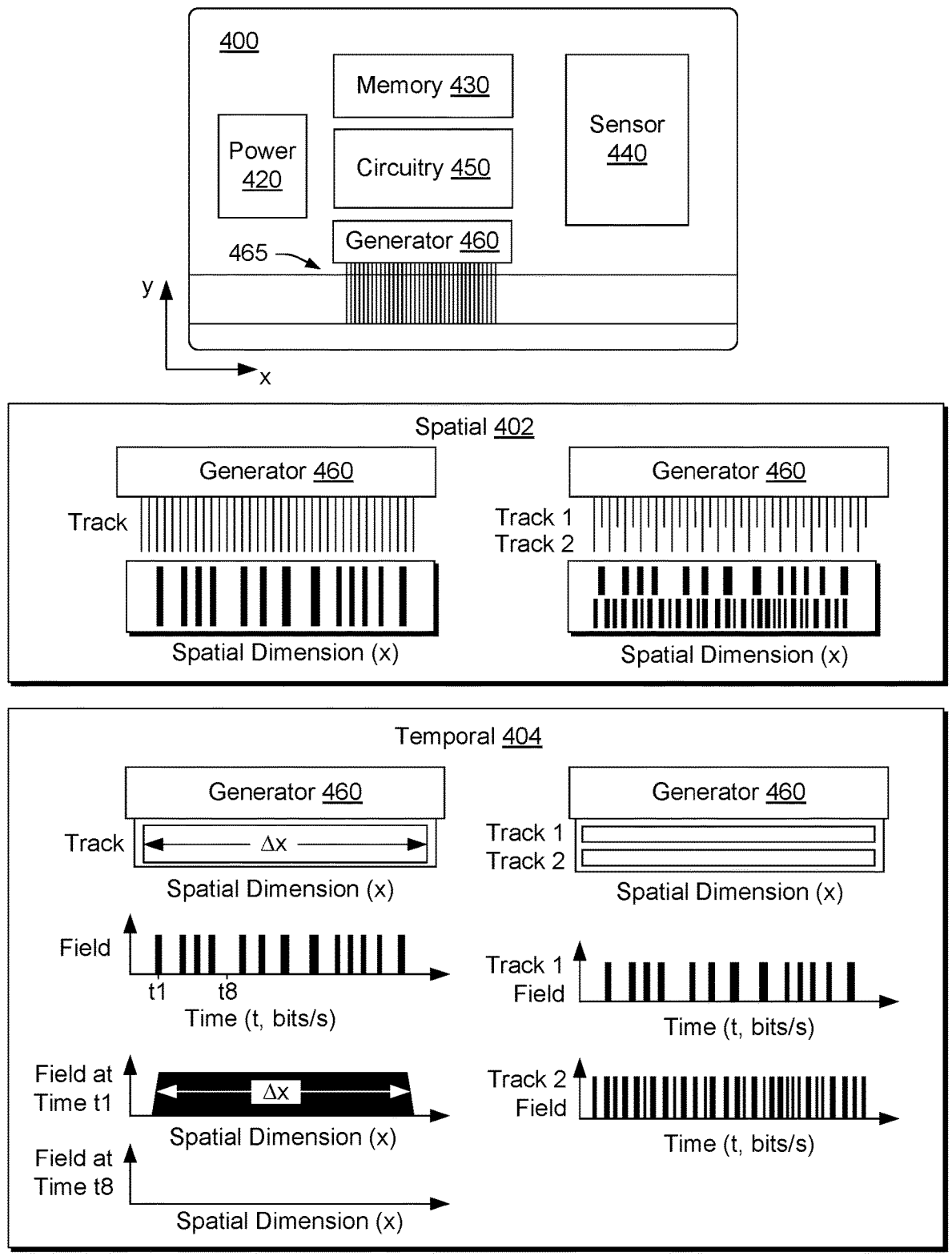
FIG. 4 is a diagram of an example of a card.

FIG. 4 shows an example of a card 400 that includes a power source 420, memory 430, a sensor 440, circuitry 450 and a generator 460 that may generate a field, for example, with respect to a field window or emissions window 465. As an example, the emissions window 465 may be defined with respect to a coordinate system such as, for example, a Cartesian coordinate system (see, e.g., x and y coordinates in FIG. 4).

In the example of FIG. 4, the card 400 includes the memory 430 that can store information; the sensor 440 that can sense information; the circuitry 450 that can authenticate sensed information (e.g., authentication circuitry); and the generator 460 that can output at least one magnetic field, for example, based at least in part on a portion of stored information responsive to authentication of sensed information.

FIG. 4 also shows some examples of spatial schemes 402 and temporal schemes 404 for outputting at least one magnetic field. For example, the generator 460 may be configured to output one or more tracks of spatial magnetic fields. As shown with respect to the spatial schemes 402, a spatial magnetic field may be defined with respect to one or more coordinates such as, for example, an x-coordinate; noting that in FIG. 4, the illustrated features are approximate as resolution may be finer (see, e.g., the information 308 of FIG. 3). As an example, a spatial magnetic field may vary in field strength with respect to a spatial coordinate.

As to output of at least one or more tracks of temporal magnetic fields, as shown with respect to the temporal schemes 404, the generator 460 may be configured to output one or more tracks of temporal magnetic fields, for example, via one or more emission windows, which may be spatially located. For example, an emission window may span a distance $\Delta x$ and provide output as to one or more tracks of information. As shown in FIG. 4, a temporal scheme may output fields with respect to time (t) to effectively output bits of information with respect to time (t). For example, FIG. 4 shows an approximate plot of field strength versus time (t), which includes times t1 and t8. As shown, at time t1, the field output by the generator 460 may be at an elevated value and relatively uniform across the emissions window that spans the distance $\Delta x$; whereas, at time t8, the generator 460 may output no field or, for example, a diminished field (e.g., at a diminished value) across the emissions window that spans the distance $\Delta x$. In such an example, the generator 460 may generate field inflection points with respect to time where the field inflection points encode information (e.g., bits of information) that may be, for example, read by a reader.

FIG. 4 also shows a temporal scheme for multiple tracks (Track 1 and Track 2) where, for example, the generator 460 may generate fields for Track 1 and may generate fields for Track 2. In such an example, the fields for each of the multiple tracks may differ. As an example, the generator 460 may optionally be configured for output of one or more tracks where, for example, multiple tracks may optionally be output simultaneously (e.g., to be read via a single swipe with respect to a reader).

As shown with respect to the temporal schemes 404, a temporal magnetic field may be defined with respect to a temporal coordinate, time (t). As an example, a temporal magnetic field may vary in field strength with respect to time (t).

As to the sensor 440 of the card 400 of FIG. 4, it may be a biometric sensor such as, for example, a fingerprint sensor. As an example, the sensor 440 may include one or more types of circuitry. For example, the sensor 440 may be configured as a capacitance sensor, which may sense passive and/or active capacitance.

As an example, a passive capacitance sensor may include an array of elements that may act individually as one plate of a parallel-plate capacitor. As to a fingerprint sensor, a dermal layer (e.g., an electrically conductive layer) may act as an opposing plate and a substantially non-conductive epidermal layer may acts as dielectric layer. In such a sensor, the elements may sense differences in the dielectric layer (e.g., via capacitance) where such differences depend on characteristics of a fingerprint (e.g., a finger or a thumb). For example, capacitance may vary between ridges and valleys of a fingerprint due to the fact that the volume between a dermal layer and a sensing element in valleys includes an air gap. As an example, the dielectric constant of an epidermis and area of a sensing element may be known and measured capacitance values may be used to distinguish between fingerprint ridges and valleys.

As an example, an active capacitance sensor may measure ridge patterns of a dermal layer. For example, an active capacitance sensor may use a charging cycle to apply a voltage to skin before measurement takes place. In such an example, the application of voltage may act to charge the effective capacitor. On a discharge cycle, the voltage across a dermal layer and a sensing element may be compared to a reference voltage for purposes of calculating capacitance. In such an example, distance values may be calculated and used to form an image of a fingerprint. An active capacitance sensor may be more immune to cleanliness of a sensing surface (e.g., a sensor window) and cleanliness of skin.

In the example of FIG. 4, the circuitry 450 may receive signals from the sensor 440 and analyze the signals with respect to stored information, for example, as stored in the memory 430. As an example, an analysis may include processing the signals to determine characteristics such as fingerprint characteristics and comparing at least a portion of the determined characteristics to at least a portion of stored fingerprint characteristics, for example, to decide whether a match exists between a sensed fingerprint and a known fingerprint. Such an approach may act to authenticate biometric information sensed via the sensor 440. Responsive to authentication of biometric information, the circuitry 450 may cause, for example, the generator 460 to generate at least one magnetic field. For example, the circuitry 450 may control the generator 460 to generate at least one magnetic field based on information associated with an identity that has been authenticated via sensing biometric information via the sensor 440. As an example, information associated with an identity may be or include account information, security information, control information, etc.

As an example, the generator 460 may output at least one magnetic field based at least in part on a portion of stored information responsive to authentication of sensed information. In such an example, the generator 460 may output at least one magnetic field for a period of time. For example, the generator 460 in the example of FIG. 4 may output at least one magnetic field for a period of time of the order of tens of seconds. As an example, a generator may output at least one magnetic field for a period of time in a range from about 10 seconds to about 120 seconds. As an example, where a generator may output at least one magnetic field to a medium (e.g., a medium that include magnetic material), a period of time may be sufficient to write information to the medium. In such an example, a period of time may be less than about 10 seconds and may be, for example, less than about 1 second.

As an example, an energy conservation algorithm may be implemented by a generator that outputs at least one magnetic field. For example, a generator may output pulses, for example, at a pulse frequency. As an example, a pulse frequency may be selected based in part on one or more characteristics of a reader (e.g., a read head and/or associated circuitry).

As an example, a generator may output at least one magnetic field based at least in part on a portion of stored information responsive to authentication of sensed information with a delay, further in response to a trigger, etc. For example, where the card 400 is a card for performing a financial transaction, in response to authentication of sensed information, a generator may delay generation of output for a period of time of the order of seconds, which may correspond to a delay between possession of the card by an authorized (e.g., authenticated) card holder and positioning of the card with respect to a reader.

As to a trigger, the card 400 may include circuitry, optionally operatively coupled to the sensor 440, which can detect presence of a reader. For example, a reader may include a slot and a card may include a sensor that can determine when the card is positioned in the slot. In such an example, responsive to authentication of sensed information, sensor circuitry may be activated that may, in response to detection of the card being positioned in the slot of the reader, cause a generator to generate at least one magnetic field to be read by the reader (e.g., one or more read heads of the reader).

As an example, a trigger may cause a generator to generate at least one magnetic field for a period of time, which may be a period of time sufficient for a reader to read the at least one magnetic field (e.g., a period of time of the order of seconds). As an example, the trigger may be programmed to allow for a predetermined number of swipes (e.g., attempts). For example, if the card detects a slot more than three times (e.g., three swipes or attempts), it may reset the card with respect to authentication of sensed information such that re-authentication is required before the generator will generate at least one magnetic field (e.g., that represents information such as account information, etc.).

As an example, various techniques, technologies, etc. may act to conserve energy of a power source and/or may act to enhance security of a card such as the card 400.

Figure 5:
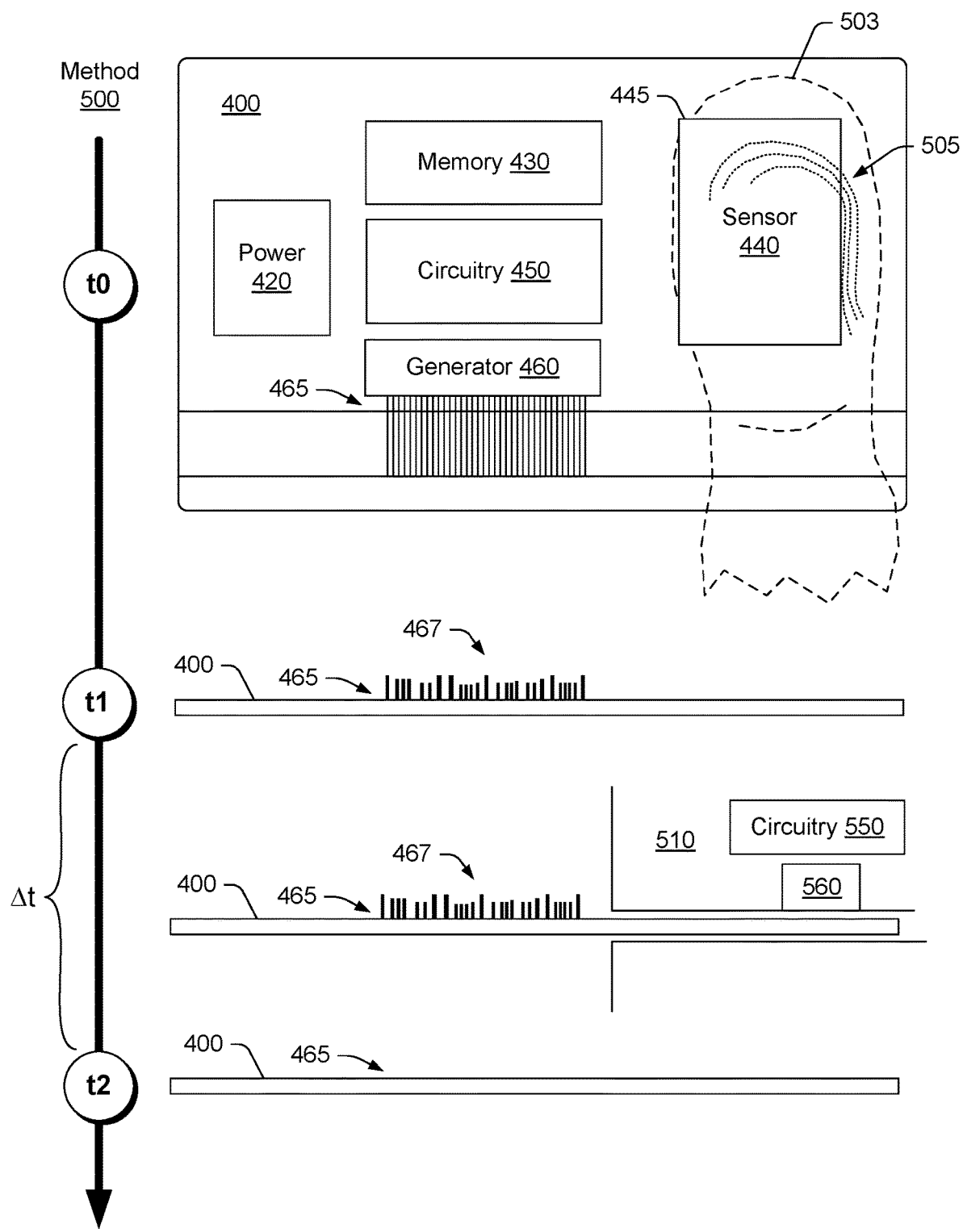
FIG. 5 is a diagram of an example of a method.

FIG. 5 shows an example of a method 500 with respect to a time line where the method 500 may include using the card 400 and, for example, reader 510 (e.g., a POS device, etc.) that includes circuitry 550 operatively coupled to a read head 560 (e.g., or read heads).

As shown in the example of FIG. 5, at a time t0, a finger 503 with a fingerprint 505 is positioned with respect to a sensor window 445 associated with the sensor 440 of the card 400. At a time t1, the generator 460 generates at an emissions window 465 at least one magnetic field 467. At a time less than t2 and greater than t1, denoted Δt, the card 400 is passed via a slot of the POS device 510. At time t2, the at least one magnetic field 467 is no longer present at the emissions window 465 (e.g., no longer presence in a manner capable of being read by the read head 560).

As an example, the card 400 may be configured to emit at least one magnetic field in a temporal manner, for example, as explained with respect to the temporal schemes 404 of FIG. 4. In such an example, upon authentication of sensed information, the generator 460 may generate a temporal field that may optionally loop in time (e.g., repeated loops for a period of time). As mentioned, information encoded may include one or more codes that may indicate a start and/or an end of a "string" of information. In such an example, the circuitry 550 of the reader 510 may be able to decode a generated temporal field, which may be, for example, "played" in a loop. As an example, a session may be a single loop play or, for example, a string of loops played within a period of time (e.g., responsive to authentication, etc.).

As an example, a temporal field such as one of the temporal fields of the temporal schemes 404 of FIG. 4 may allow for placing a card in a reader without translating the card in the reader as the temporal aspect of the field may mimic a bit rate achieved via swiping. For example, a generator may output a temporal field that varies in strength (e.g., to create inflection points) at a rate that matches a rate (e.g., within an operable range of rates) of a read head or read heads (e.g., of a reader, etc.). As mentioned, a reader for a magnetic stripe card may be configured to operate within a range of data rates, for example, consider a range from about 600 bits per second to about 4000 bits per second.

As an example, a method may include emitting magnetic fields via a stationary emissions window of an apparatus at a data rate that matches a data rate of magnetic field read circuitry (e.g., a read head). In such an example, the magnetic fields may include magnetic field inflection points that occur with respect to time that represent bits of information. In such an example, the magnetic field read circuitry may decode the bits of information as emitted via the stationary emissions window.

Figure 6:
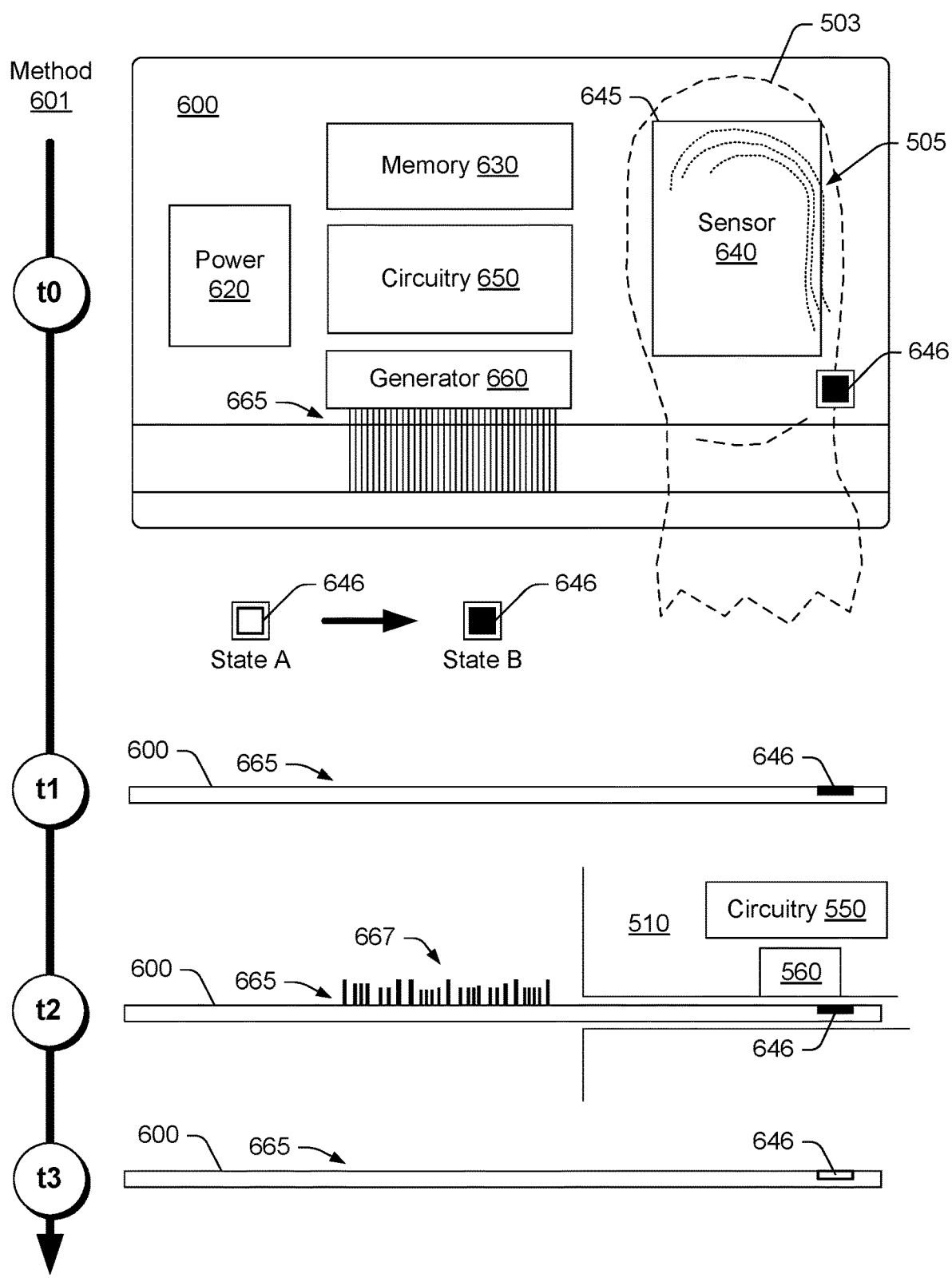
FIG. 6 is a diagram of an example of a card and an example of a method.

FIG. 6 shows an example of a card 600 and an example of a method 601 with respect to a time line where the method 601 may include using the card 600 and, for example, the reader 510 that includes the circuitry 550 operatively coupled to the read head 560 (e.g., or read heads).

In the example of FIG. 6, the card 600 includes a power source 620, memory 630, a sensor 640, a reader sensor 646, circuitry 650 and a generator 660 that may generate a field, for example, with respect to a field window or emissions window 665. As an example, the emissions window 665 may be defined with respect to a coordinate system such as, for example, a Cartesian coordinate system (see, e.g., x and y coordinates in FIG. 6).

In the example of FIG. 6, the card 600 includes the memory 630 that can store information; the sensor 640 that can sense information; the reader sensor 646 that can sense presence of a reader; the circuitry 650 that can authenticate sensed information (e.g., authentication circuitry); and the generator 660 that can output at least one magnetic field, for example, based at least in part on a portion of stored information responsive to authentication of sensed information and, for example, responsive to sensed presence of a reader (e.g., per the reader sensor 646).

As shown in the example of FIG. 6, at a time t0, a finger 503 with a fingerprint 505 is positioned with respect to a sensor window 645 associated with the sensor 640 of the card 600. Responsive to authentication of the fingerprint 505, for example, by comparison to biometric information stored in the memory 630, the circuitry 650 of the card 600 may activate the reader sensor 646. As shown in the example of FIG. 6, the reader sensor 646 may be associated with one or more states where it may transition from one state to another state (e.g., from State A to State B) responsive to authentication of sensed information by the sensor 640. In such an example, the reader sensor 646 may act as a trigger that may be in a set state or a non-set state. In a set state, the reader sensor 646 may be energized, for example, to detect proximity of the card 600 with respect to a reader such as the reader 510. For example, the reader sensor 646 may be a proximity sensor that may emit, detect or emit and detect energy to determine whether it is proximate to a reader (e.g., within a slot of a card reader, etc.).

As shown in the example of FIG. 6, at a time t1, the card 600 is in a set state per activation of the reader sensor 646, which may be responsive to authentication of the fingerprint 505 as sensed via the sense window 645. In the set state, the card 600 is shown as not emitting a field via the emissions window 665.

As shown in the example of FIG. 6, at a time t2, the reader sensor 646 is positioned proximate to the reader 510 by, for example, entering a slot of the reader 510. In response, the generator 660 generates at the emissions window 665 at least one magnetic field 667 while the card 600 may be in transit in a slot of the reader 510. At time t3, the at least one magnetic field 667 is no longer present at the emissions window 665 (e.g., no longer present in a manner capable of being read by the read head 560). In the example of FIG. 6, the at least one magnetic field 667 may include magnetic fields spatially arranged to effectively create inflection points. In such an example, the magnitude of fields generated may be relatively even, differ, etc.

As an example, the card 600 may transition from a set state to a non-set state after being positioned proximate to a reader. For example, where the reader sensor 646 detects a reader, the generator 660 may generate at least one magnetic field at the emissions window 665 for a period of time, which may be, for example, based at least in part on a swipe speed (e.g., or a range of swipe speeds). In such an example, after the period of time passes, re-generation of the at least one magnetic field may depend on re-authentication and re-setting of the reader sensor 646 (e.g., or appropriate circuitry associated therewith). As an example, the card 600 may be configured to allow for a predetermined number of passes with respect to a reader (e.g., through a slot of a reader, etc.), for example, based on one or more of a period of time, a number of sensed passes per the reader sensor 646, etc. As an example, a predetermined number of passes may be two or more and, for example, less than about six. A number of passes may be allowed, for example, as a read error may occur for one or more reasons (e.g., alignment of a card with respect to a reader, swipe speed, etc.). As an example, a session may be a single pass or, for example, a string of passes that occur within a period of time (e.g., responsive to authentication and/or sensing proximity to a reader, etc.).

As an example, the card 600 may be configured to emit at least one magnetic field in a temporal manner, for example, as explained with respect to the temporal schemes 404 of FIG. 4. In such an example, where the reader sensor 646 is in an active state (e.g., a set state), detection of proximity to the reader 510 may cause the generator 660 to generate a temporal field that may optionally loop in time (e.g., repeated loops for a period of time). As mentioned, information encoded may include one or more codes that may indicate a start and/or an end of a "string" of information. In such an example, the circuitry 550 of the reader 510 may be able to decode a generated temporal field, which may be, for example, "played" in a loop. As an example, a session may be a single loop play or, for example, a string of loops played within a period of time (e.g., responsive to authentication and/or sensing proximity to a reader, etc.).

Figure 7:
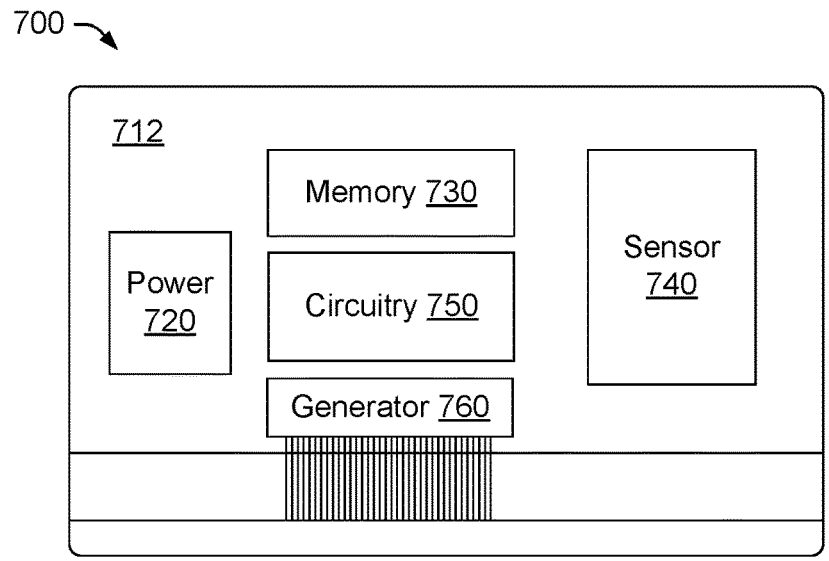
FIG. 7 is a diagram of an example of a card.
Figure 7:
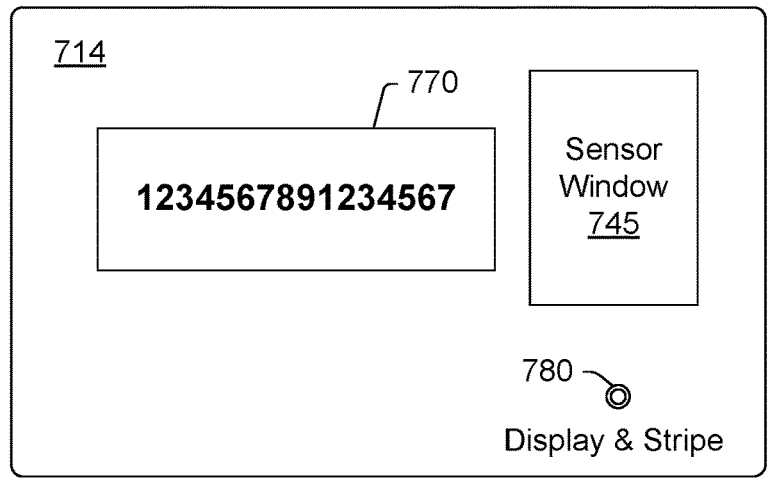
Figure 7:
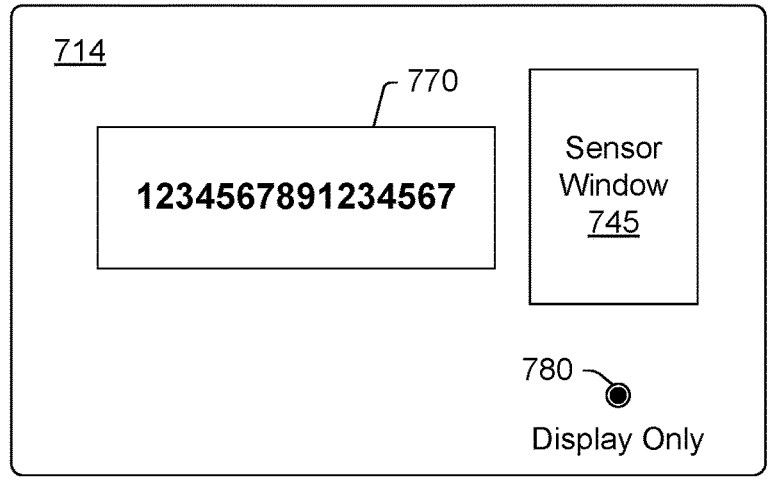

FIG. 7 shows an example of a card 700 that includes opposing sides 712 and 714 and that includes a power source 720, memory 730, a sensor 740, circuitry 750 and optionally a generator 760. As shown in the example of FIG. 7, the card 700 may include a sensor window 745, a display 770 and/or an indicator 780. As an example, the sensor window 745, the display 770 and/or the indicator 780 may be located on one side of the card 700, both sides of the card 700, etc.

As an example, the card 700 may be configured via the circuitry 750 to render information to the display 770. As an example, the display 770 may display information such as account information for one or more accounts. As an example, the card 700 may store information for one account in association with a right hand thumb and may store information for another account in association with a left hand thumb. In such an example, an authentication algorithm may determine whether sensed biometric information is associated with an identity and an account. In turn, the card 700 may output information associated with the account (e.g., output via the generator 760 and/or the display 770). As an example, a card may be configured with information for a plurality of accounts where an association exists between individual fingerprints and individual accounts.

As an example, the display 770 of the card 700 may display information such as, for example, a transaction identifier (e.g., "Number for this purchase: 9876 7888 1234 4444"), a name, a credit card or debit card number, an expiration date, a code, etc.

As an example, the indicator 780 may be an emitter such as, for example, a LED. As an example, the indicator 780 may be a LCD-based indicator, for example, that may be clear, opaque, etc. depending on state. As an example, the indicator 780 may have states and may, for example, transition from one state to another state (e.g., and vice versa) with respect to time, depending on type of output (e.g., output via the generator 760, output via the display 770, output via the generator 760 and the display 770). As an example, a state or states of the indicator 780 may indicate, for example, authentication, lack of authentication, time remaining, time expired, etc.

Figure 8:
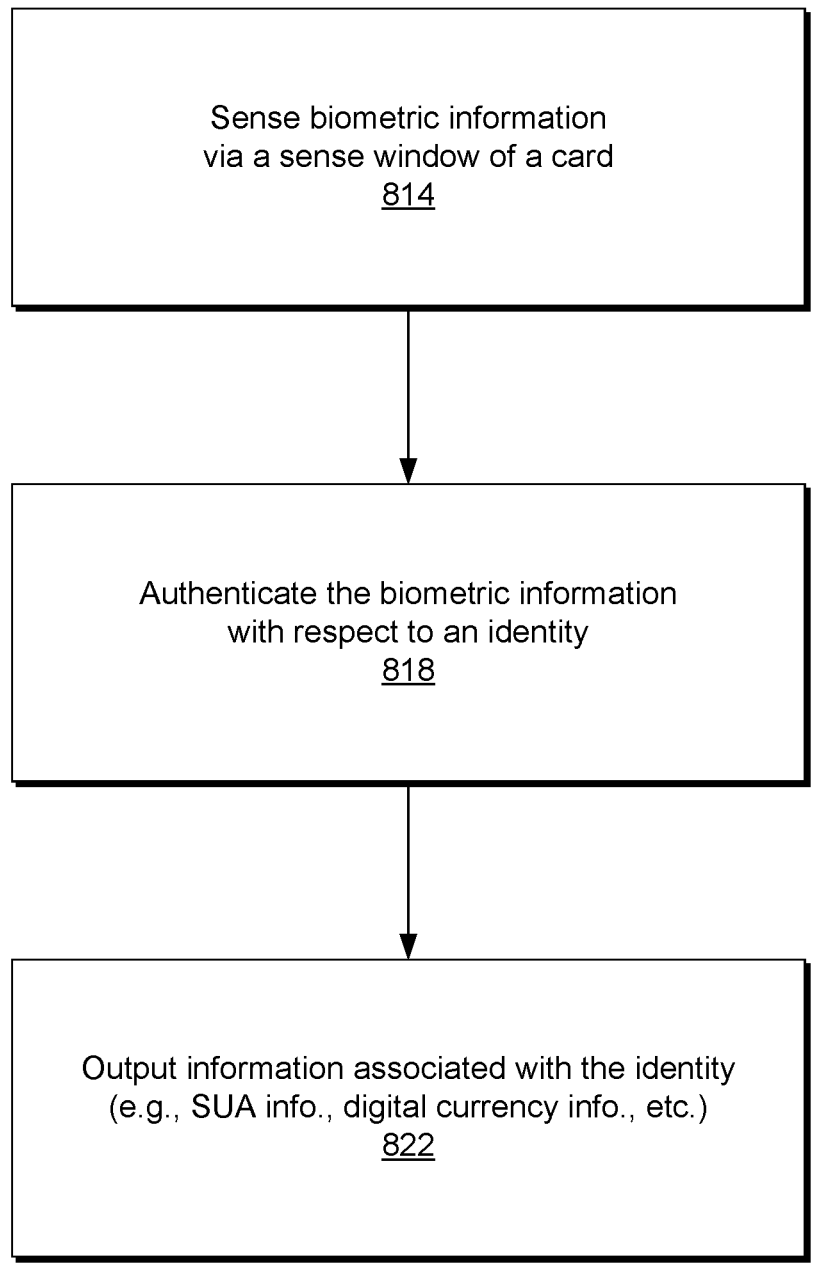
FIG. 8 is a diagram of an example of a method.

FIG. 8 shows an example of a method 810 that includes a sense block 814 for sensing biometric information via a sense window of a card, an authentication block 818 for authenticating the biometric information with respect to an identity, and an output block 822 for outputting information associated with the identity. For example, the information may be or include account information (e.g., SUA or other account information), digital currency information, etc.

As an example, a method can include sensing biometric information via a sense window of a card; authenticating the biometric information with respect to an identity; and outputting single-use account information associated with the identity. In such an example, the window may be an emissions window that emits at least one magnetic field that represents the single-use account information. As an example, single-use account information may be emitted as a magnetic field via a window. As an example, a window may be a display window and single-use account information may be or include a single-use account number that may be displayed to the display window. As an example, a method may include outputting single use account information via a window where the single-use account information is a single-use account number. As an example, a method may include outputting a plurality of a single-use account numbers. In such an example, a mechanism may be provided to receive input to select one of the plurality of single-use account numbers.

As an example, a method may include passing a card through a magnetic stripe reader such as, for example, a POS device, a security device, etc. For example, a card may be an identity card that permits an individual to access a building, a room, a vehicle, etc. As an example, a card may be an identity card that permits an individual to log into a system. For example, a system may be a computer system, an attendance system, etc.

Figure 9:
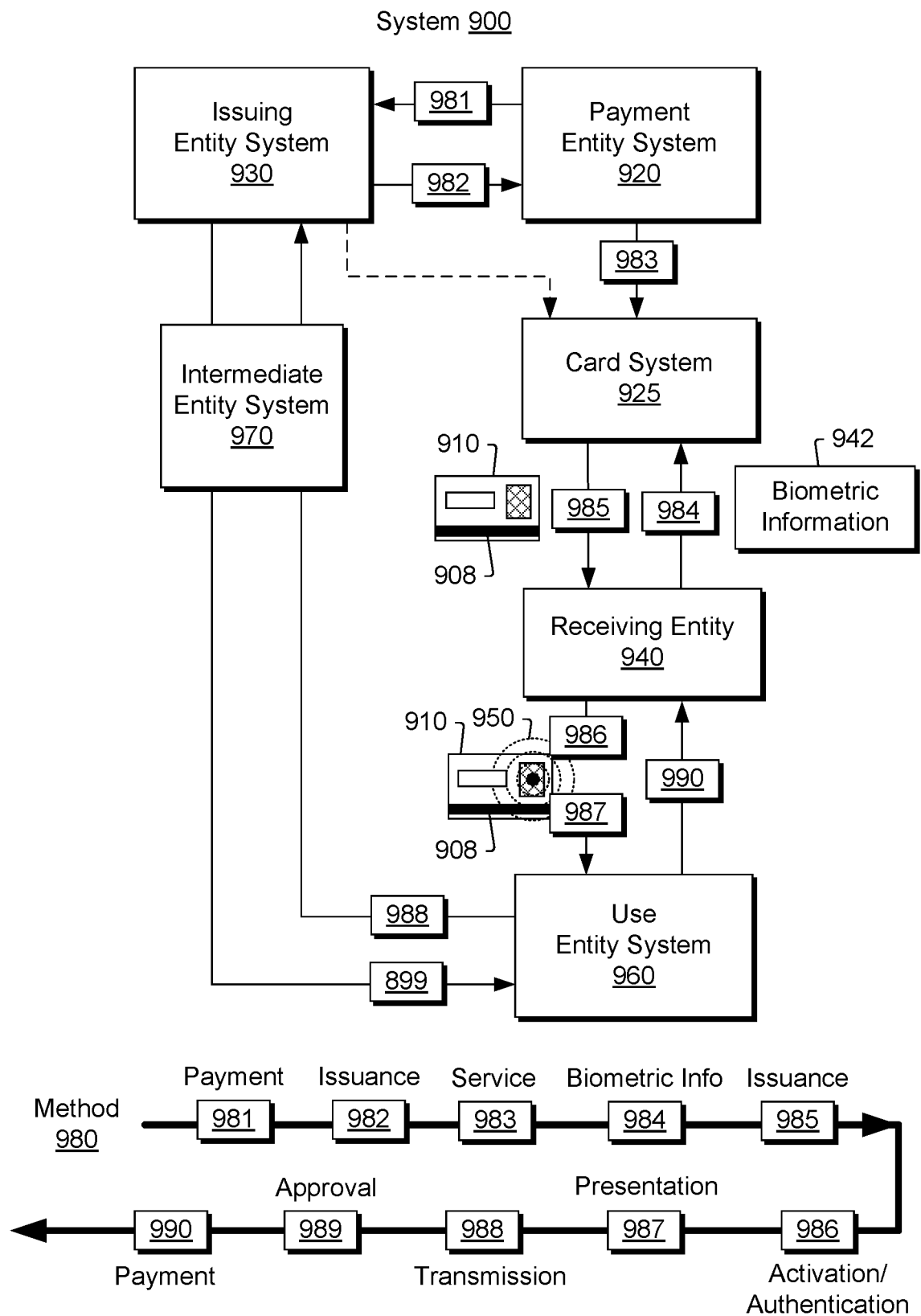
FIG. 9 is a diagram of an example of a system and an example of a method.

FIG. 9 shows an example of a system 900 and an example of a method 980 that may optionally be implemented using a system such as, for example, the system 900. In FIG. 9, the system 900 is shown with respect to information 908, which may be stored, as an example, on a card 910. For example, the card 910 may include a magnetic strip or stripe that includes magnetizable material (e.g., a metal oxide) that can have magnetic flux that represents at least a portion of the information 908, a display for displaying representations for at least a portion of the information 908, etc. In the example of FIG. 9, the card 910 also includes authentication circuitry 950 that may be configured to authenticate, for example, biometric information. In such an example, at least a portion of the information 908 may become available (e.g., via visual, tactile, magnetic and/or another mechanism) responsive to authentication of biometric information. Availability of information in such a manner may provide for initiating a transaction, furthering a transaction, etc.

In the example of FIG. 9, the information 908 may pertain to a SUA, a controlled-use account, controlled use accounts, digital currency or other type of information. As an example of digital currency, consider a cryptocurrency such as the Bitcoin currency.

As an example, the card 910 of FIG. 9 may be a digital currency card. As an example, the card 910 may be a SUA card. As an example, the card 910 may be a controlled-use account card, optionally for multiple accounts.

In FIG. 9, the system 900 includes a payment entity system 920, a card system 925, an issuing entity system 930, a receiving entity 940 (e.g., optionally a receiving entity system), a use entity system 960 and, optionally, an intermediate entity system 970 (e.g., an intermediary entity system). In the example of FIG. 9, an entity system may be or include an information handling system (IHS), which may include one or more processors, memory (e.g., an information storage device(s)), one or more network interfaces, etc. For example, information may be received and/or transmitted via one or more network interfaces, stored in memory and, for example, optionally processed by one or more processors. As an example, memory may be accessible by a processor, a network interface may be accessible by a processor, etc., for example, to communicate information, process information, etc.

In FIG. 9, the method 980 is shown as include a payment block 981 for making a payment to an issuing entity system (e.g., paying or committing to pay an issuing entity system), an issuance block 982 for issuing information associated with at least a portion of the payment, a service block 983 for requesting a card system service, a biometric information block 984 for transmitting biometric information (e.g., biometric information 942) to the card system, an issuance block 985 for issuing a card via the card system to a receiving entity, an activation block 986 for activating the card to output information associated with at least a portion of the payment of the payment block 981, a presentation block 987 for presenting the output information to a use entity (e.g., via a mechanism), a transmission block 988 for transmitting at least a portion of the output information to the issuing entity (e.g., or an intermediate entity), an approval block 989 for approving at least a portion of the information and a payment block 990 for making a payment to the receiving entity based at least in part on an approval (e.g., a transfer of currency, transfer of ownership of digital currency, etc.). As indicated in FIG. 9, the method 980 may optionally be implemented with respect to the system 900.

In the example of FIG. 9, the card system 925 may receive information from the payment entity system 920, the issuing entity system 930 and/or the receiving entity 940. As an example, the card system 925 may include a security mechanism that avoids the biometric information 942 associated with the receiving entity 940 from being shared or accessed by one or more of the payment entity system 920, the issuing entity system 930, etc. In such a manner, trust may be established between the card system 925 and the receiving entity 940, which may receive the card 910 (e.g., as a physical card) from the card system 925 where the card 910 includes at least a portion of the biometric information 942 (e.g., for use by authentication circuitry 950 of the card 910).

As an example, a card may include a sensor for sensing biometric information. In such an example, biometric information may be one or more of a fingerprint, a signature or an eye pattern. As an example, a card may output sensed biometric information, for example, for transmission to an authority that may determine authenticity of the biometric information. In such an example, a card may be provided optionally without stored biometric information. As an example, a transaction may involve local authentication of biometric information (e.g., via authentication circuitry of a card) and remote authentication of biometric information (e.g., via a remote authority with authentication circuitry). As an example, a fingerprint may be sensed via a sensor where sensed information associated with the fingerprint may be output as a signal such as a magnetic field signal. As an example, a signature may be sensed via a sensor where sensed information associated with the signature may be output as a signal such as a magnetic field signal. As an example, a card may include one or more sensors for sensing one or more types of biometric information.

Figure 10:
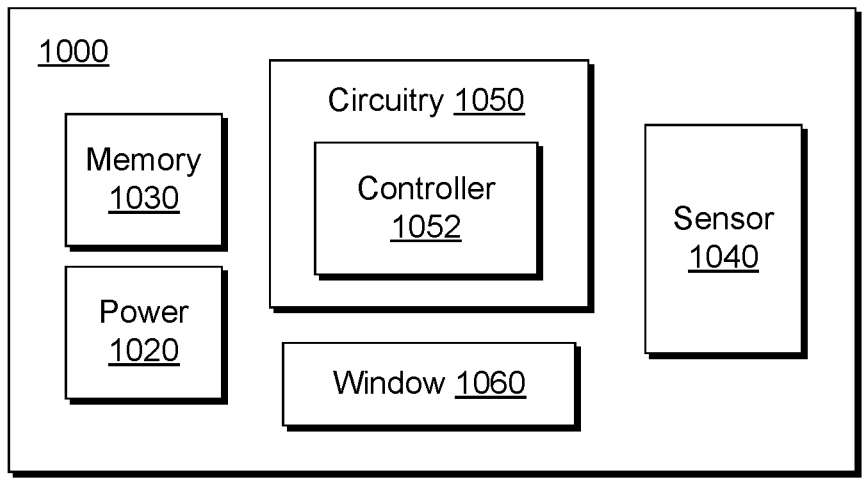
FIG. 10 is a diagram of an example of a card and examples circuitry and other features.
Figure 10:
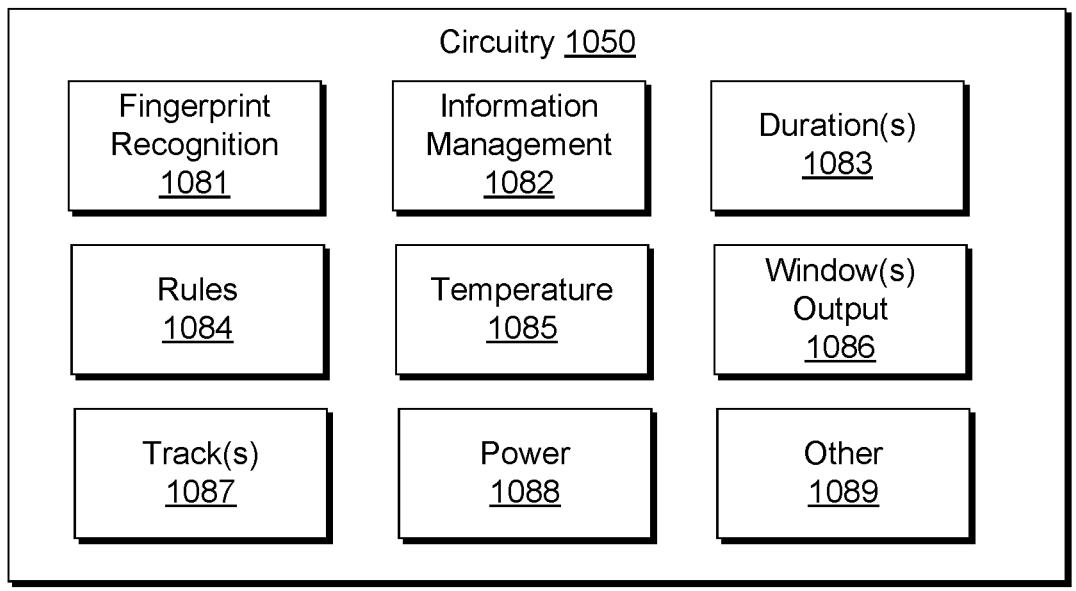
Figure 10:
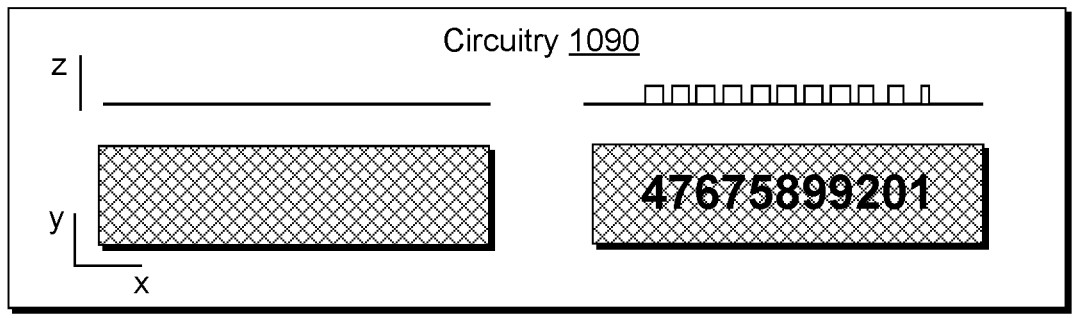

FIG. 10 shows an example of an apparatus 1000 that includes a power source 1020, memory 1030, a sensor 1040, circuitry 1050 that includes a controller 1052, and a window 1060. As an example, the power source 1020 may be a battery or batteries. As an example, a battery may be a lithium-ion-based battery or other type of battery. As an example, the controller 1052 may be a microcontroller, for example, such as an ARC-based microcontroller, an ARM-based microcontroller, etc. As an example, the controller 1052 may be or include a processor. As an example, the apparatus 1000 may be a card (e.g., formed as a card, have a card form factor, etc.).

In the example of FIG. 10, the circuitry 1050 may be configured for fingerprint recognition 1081, information management 1082, duration(s) 1083, rules 1084, temperature 1085, output to a window 1086, track(s) 1087, power 1088 and/or other functionality 1089.

As shown in FIG. 10, as an example, an apparatus may include tactile output circuitry 1090 that can, for example, control a mechanism that can raise a surface of the apparatus in a manner that may be visually read, tactilely felt, processed via an impression reader, etc. For example, a POS system may be electronic (e.g., ETS) or non-electronic. A non-electronic POS may include multilayer purchase slips to record credit card information, for example, where raised characters on a credit card can make a carbon copy impression of the credit card when a roller slides across a tray of a POS device. As an example, a manual credit card machine may help facilitate a transaction in the event of a power outage or problem with an automated regular credit card machine. As an example, a tactile output may output information for a period of time in an active state before returning to a wait or sleep state.

Figure 11:
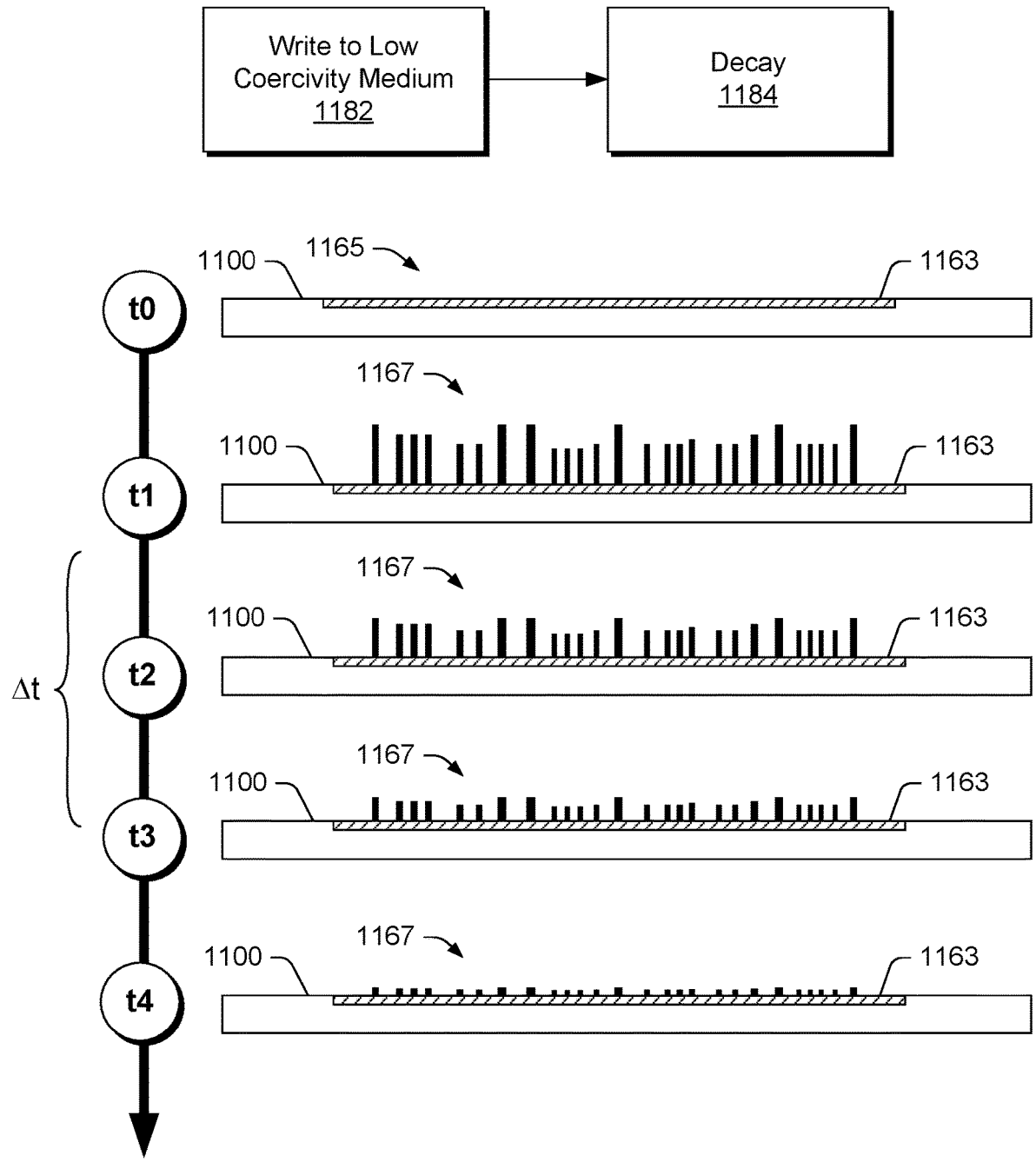
FIG. 11 is a diagram of an example of a method.

As mentioned, a card may optionally include a medium that includes magnetic material. FIG. 11 shows an example of a method 1180 that includes a write block 1182 for writing information to a low coercivity medium and a decay block 1184 where the written information decays with respect to time (e.g., the low coercivity medium loses the signal). As shown with respect to a time line, at a time t0, a card 1100 includes a medium 1163 and an emissions window 1165 that does not emit a magnetic field (e.g., at a level sufficient to allow for reading by a read head of a reader). At a time t1, a generator of the card 1100 may generate at least one magnetic field that writes information to the medium 1163 such that the medium 1163 emits at least one magnetic field 1167 that represents the information. At time t2, the medium 1163 may emit the at least one magnetic field 1167 with less strength, which may continue to decay over time (e.g., from times t3 to t4, etc.). In such an example, the strength of the at least one magnetic field emitted by the medium 1163 may be sufficient between the times t1 and t3 for reading by a read head (e.g., or read heads) of a reader (see, e.g., the reader 510 of FIG. 5, etc.).

As an example, a card may include a temperature sensor. As an example, a sensed temperature may determine an amount of energy to be used for generating at least one magnetic field. For example, the medium 1163 of the card 1100 of FIG. 11 may be dependent on temperature as to one of more characteristics of magnetic material that it includes. As an example, temperature may be related to a decay rate such that a higher temperature causes a more rapid decay in at least one magnetic field of the medium 1163. As an example, where at least one magnetic field is to persist for a period of time with respect to a medium, a generator may generate a stronger field where temperature is higher and a lower field where temperature is lower. Such an approach may act to maintain a relatively constant period of time, for example, regardless of temperature.

As an example, a method may include writing information to a medium and for erasing information written to the medium. As an example, a method may include writing information to a medium and overwriting information written to the medium (e.g., to obscure the information for purposes of security, to present different information, etc.).

As an example, a power source may conserve power through use of a medium that includes a magnetic material. For example, a card may include a power source that may activate a generator powered by the power source for a limited period of time, for example, a period of time sufficient to write information to a medium that includes a magnetic material and, for example, to optionally erase information written to a medium that includes a magnetic material and/or to overwrite information written to a medium that includes a magnetic material.

As an example, a method may include simulating a magnetic swipe card capability with a microcontroller managed emitter and a fingerprint reader, for example, as packaged according to a standard credit card format. In such an example, a stripe region on a card may be a thin film magnetic film configured to emit at least one magnetic field (e.g., via generator circuitry). As an example, the film may run a length of a card or a portion thereof. As an example, when activated, the film may act to transmit magnetic signals at a data rate, for example, akin to swiping the card at normal speed through a reader.

As an example, a detector (e.g., optical, magnetic, electric, capacitive, etc.) may determine a card is being swiped and, for example, initiate information transmission. As an example, a card may include a fingerprint reader, for example, optionally coupled to a microcontroller. As an example, a fingerprint reader may include a detector that acts to power on a microcontroller, for example, such that battery power is used when the fingerprint reader is covered by a finger (e.g., finger or thumb or combination thereof).

As an example, a microcontroller may prohibit transmission of card data unless an authorized fingerprint had been detected (e.g., authenticated). As an example, a card may not have account information externally thereon.

As an example, a security mechanism may allow for transmission of card data when a valid fingerprint is detected. As an example, a card may be configured to transmit card data for a short period (e.g., about 20 seconds) after a fingerprint has been validated (e.g., authenticated).

As an example, a user (e.g., card owner, authorized card holder, etc.) may get ready to make a transaction, removes a card from his wallet and puts his finger on a sensor window of the card. The user may then hand the card to a clerk who then swipes the card through a slot of a reader. In such an example, the card may determine that a swipe is in process and transmit card data (e.g., information stored in memory of the card) for reading by a read head of the reader (e.g., which may be a POS device). As an example, a timeout may occur (e.g., via a timer circuit) such that the card becomes locked and cannot be used until a valid fingerprint is read again.

Figure 12:
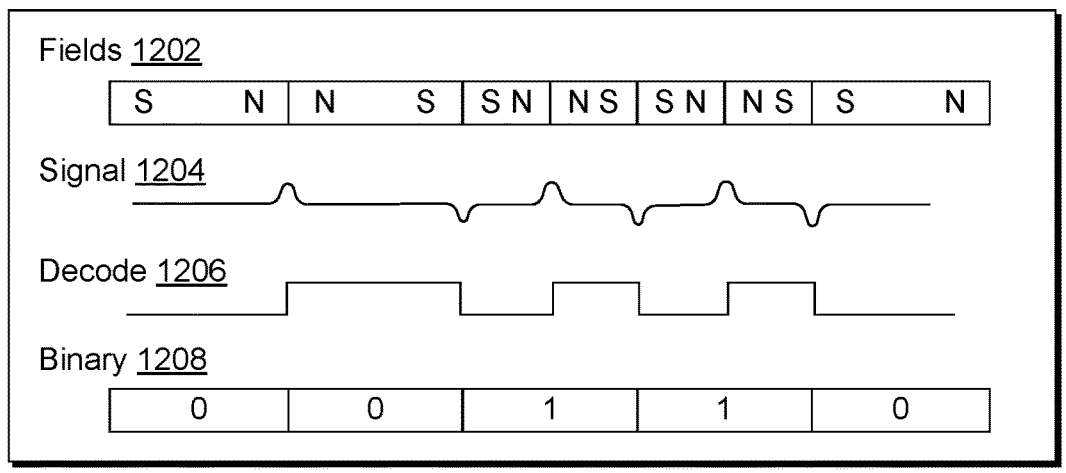
FIG. 12 is a diagram of an example of a system.
Figure 12:
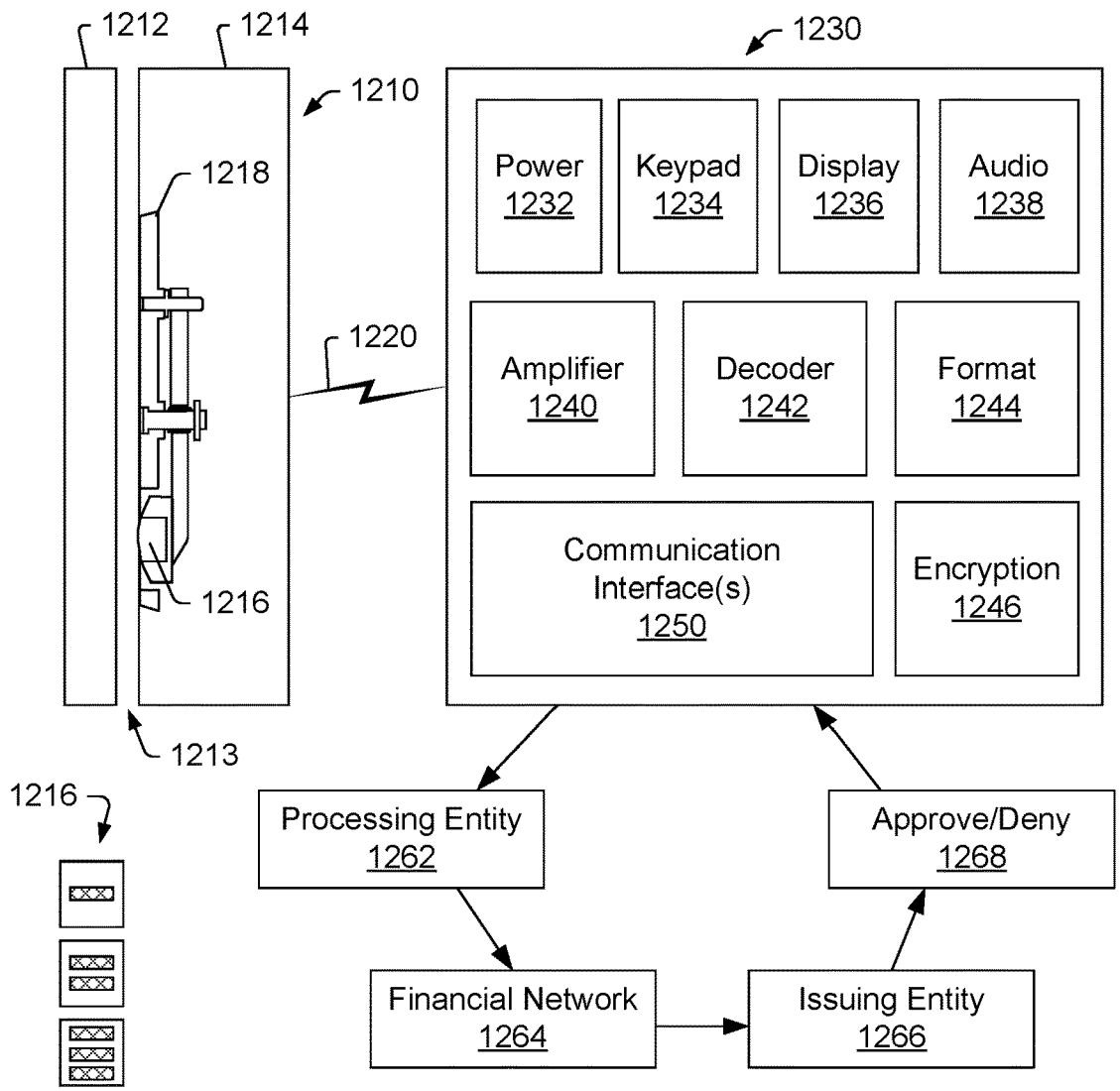

FIG. 12 shows an example of a system 1200 that includes a reader 1210 operatively coupled to circuitry 1230, for example, via a link 1220 (e.g., a wired link, a wireless link, etc.). As an example, the reader 1210 may read one or more magnetic fields 1202 and generate a signal 1204 that the circuitry 1230 may receive and decode to provide decoded information 1206 that may be further processed by the circuitry 1230 to provide formatted information 1208, for example, in a binary format. In such an example, the signal 1204 may be encoded per an encoding scheme such as, for example, the F2F (Aiken Biphase) encoding scheme (e.g., per ISO/IEC-7811) where, in the approximate illustration of FIG. 12, a "0" may be represented as a single magnet two units in length and a "1" may be represented as two magnets that are each one unit in length (see, e.g., the flux transitions in the signal 1204).

In the example of FIG. 12, the reader 1210 includes two portions 1212 and 1214 that define a slot 1213. As shown, a read head 1216 is positioned facing the slot 1213 via a mechanism 1218, which may, for example, include an arm and a spring that carry and bias the read head 1216. As an example, the read head 1216 may include one or more track circuits, for example, to read one or more tracks of information (e.g., tracks of magnetic fields). As shown, the reader 1210 and the circuitry 1230 are linked via the link 1220 such that signals read by the read head 1216 may be transmitted to the circuitry 1230 (e.g., via a wired link, a wireless link, etc.).

As an example, an emissions window of a device (e.g., such as a card, etc.) may be positioned on the device such that it can emit signals to be read by a read head such as the read head 1216. As an example, an emissions window may emit signals outwardly in one direction or, for example, outwardly in two directions (e.g., to optionally allow for multiple orientations of a device with respect to a read head). As mentioned, as an example, a device may include an emissions window that emits signals where such signals may be read by a read head when the device is stationary with respect to the read head. For example, a device may be positioned in the slot 1213 for a period of time (e.g., without translating the device) during which signals are emitted by the device (e.g., via an emissions window) such that a read head may read the emitted signals.

As shown in the example of FIG. 12, the circuitry 1230 may include a power supply or connector 1232, keypad circuitry 1234, display circuitry 1236, audio circuitry 1238, amplification circuitry 1240, decoder circuitry 1242, format circuitry 1244, encryption circuitry 1246 and one or more communication interfaces 1250.

As an example, signals read by the read head 1216 may be transmitted to the amplification circuitry 1240 via the link 1220. The amplification circuitry 1240 may optionally include automatic gain control (AGC) circuitry that may adjust amplitude of received signals (e.g., input waveforms), for example, to enhance dynamic range. As an example, the decoder circuitry 1242 may include analog-to-digital conversion (ADC) circuitry that can convert received signals, for example, as adjusted by the amplification circuitry 1240. As an example, the amplification circuitry 1240 may include ADC circuitry, for example, to monitor input signal levels and adjust programmable gain amplification (PGA) circuitry. As an example, the amplification circuitry 1240 may include a peak and hold circuit (e.g., to hold one or more peak amplitudes). As an example, ADC circuitry may be implemented for peak detection and may operate in a range, for example, from about 100 ksps to about 1 Msps.

As an example, the format circuitry 1244 may format output from the decoder circuitry 1242, which may be then encrypted via the encryption circuitry 1246, for example, to encrypt formatted information prior to transmission via at least one of the one or more communication interfaces 1250. As an example, the encryption circuitry 1246 may provide for error checking. For example, the encryption circuitry 1246 may be configured according to an algorithm that performs, at least in part, a checksum. As an example, consider the Luhn algorithm (e.g., modulus 10 algorithm) that may include a checksum formula that may be implemented to validate information such as, for example, an identification number (e.g., a credit card number, etc.).

As an example, the circuitry 1230 may include one or more operational amplifiers (e.g., for a signal gain stage), one or more PGAs (e.g., for one or more AGCs), one or more ADCs (e.g., single or multichannel, about 12-bit depth, etc.), one or more digital-to-analog converters (DACs), one or more comparators, one or more sample and hold circuits, and optionally a microcontroller (e.g., an ARM-based microcontroller, an ARC-based microcontroller, etc.). As an example, the circuitry 1230 may include a processor, which may be or include a microcontroller.

As an example, the system 1200 may be implemented as a POS system. For example, the circuitry 1230 may transmit information to a processing entity 1262 that may direct information to an appropriate financial network 1264 for transmission to, for example, an issuing entity 1266. In such an example, the issuing entity 1266 may make a determination as to whether a financial transaction associated with the information transmitted by the circuitry 1230 is approved or denied. As shown in the example of FIG. 12, an approval or a denial 1268 may be transmitted for receipt by the circuitry 1230 via at least one of the one or more communication interfaces 1250. Such a loop may be considered to include an authorization request (e.g., for a particular amount of currency) and an authorization response (e.g., approved or denied).

As an example, an apparatus can include a display; memory that stores biometric information and single-use account information for at least one single-use account; a biometric sensor that senses biometric information; authentication circuitry that authenticates sensed biometric information at least in part via a comparison to stored biometric information; display circuitry that renders single-use account information to the display responsive to authentication of sensed biometric information; selection circuitry that selects one of said at least one single-use account associated with single-use account information rendered to the display; and a field generator that generates an output session that outputs at least one magnetic field that represents single-use account information for the selected one of said at least one single-use account. As an example, such an apparatus may have a card form factor.

As an example, single-use account information may include a single-use account number for each of at least one single-use account. As an example, a digital currency such as a cryptocurrency may be a single-use account (e.g., for an amount of the digital currency).

As an example, an apparatus may include a touch display, for example, operatively coupled to selection circuitry. In such an example, the touch display may receive touch input to select an account, for example, from a plurality of accounts. As an example, circuitry may render amounts to a display where selection circuitry can receive input to select one of the amounts. As an example, a touch display may render a keypad to a display for receipt of numbers, for example, to define an amount, which may be a currency amount for a transaction. For example, an apparatus for performing digital currency transactions where an amount may be received via an input mechanism such as a touch display to transfer ownership of the amount of digital currency from a payor to a payee.

As an example, an apparatus may include restriction circuitry that restricts, for example, a field generator to one output session per single-use account. For example, consider a card that stores account information for a plurality of single-use accounts. Where one of the plurality of single-use accounts is selected and information representing that account output via a field generator (e.g., a magnetic field generator, etc.), the card may restrict further output of that information (e.g., optionally be deleting at least a portion of the information representing the particular account).

As an example, an apparatus may include memory that does not store information germane to validity of at least one single-use account for which information may be stored in the memory. For example, a single-use account number may be stored in memory without an indicator as to whether or not the number is valid. In such an example, upon authentication of biometric information, the number may be transmitted, for example, to an intermediary, to determine whether the number is valid.

As an example, an apparatus may include a battery. As an example, an apparatus may include a sensor, for example, a fingerprint sensor. As an example, an apparatus may include an emissions window, wherein the field generator outputs the at least one magnetic field to the emissions window.

As an example, an apparatus can include memory that stores biometric information and account information associated with at least one account; a sensor that senses biometric information; authentication circuitry that authenticates sensed biometric information via a comparison to stored biometric information; a field generator that generates an output session that outputs at least one magnetic field based at least in part on the account information responsive to authentication of sensed biometric information; and restriction circuitry that restricts the field generator to one output session per account. In such an example, the apparatus may have a card form factor.

As an example, the aforementioned apparatus may include account information that includes a single-use account number for each of the at least one account. As an example, an apparatus may include restriction circuitry that deletes at least a portion of the account information, for example, after participating in a transaction that involves at least the portion of the account information.

As an example, an apparatus may include a battery that may power one or more types of circuitry. As an example, an apparatus may include one or more of a fingerprint sensor, a touch display, a touch sensor, a keypad, and an LED.

As an example, an apparatus may include an emissions window, where a field generator may output at least one magnetic field to the emissions window, where the apparatus may include a sense window and where a sensor senses information via the sense window (e.g., biometric information, touch information, etc.).

As an example, a method can include sensing biometric information via a sense window of an apparatus; authenticating the biometric information with respect to an identity; and outputting single-use account information associated with the identity. In such an example, the outputting can include emitting the single-use account information as a magnetic field via an emissions window of the apparatus. As an example, a method may include outputting single-use account information by displaying the single use account information via a display window of an apparatus, where the single-use account information includes a single-use account number. As an example, a method may include outputting a plurality of single-use account numbers.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 13:
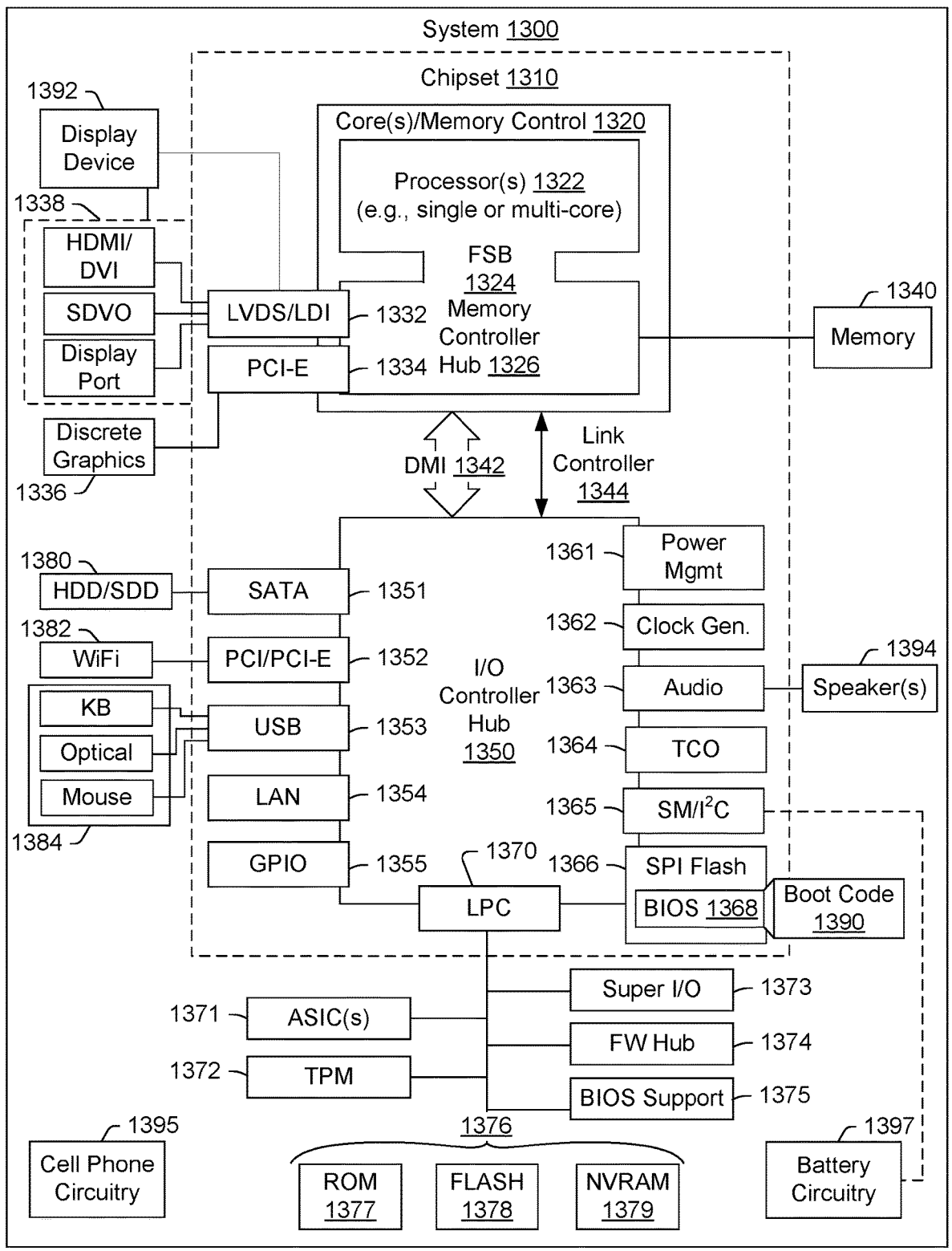
FIG. 13 is a diagram of an example of a system that includes one or more processors.

While various examples of circuits or circuitry have been discussed, FIG. 13 depicts a block diagram of an illustrative computer system 1300. The system 1300 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, NC; however, as apparent from the description herein, a satellite, a base, a server or other machine may include other features or only some of the features of the system 1300. As described herein, a device such as a reader device, another device, etc. may include at least some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Figure 14:
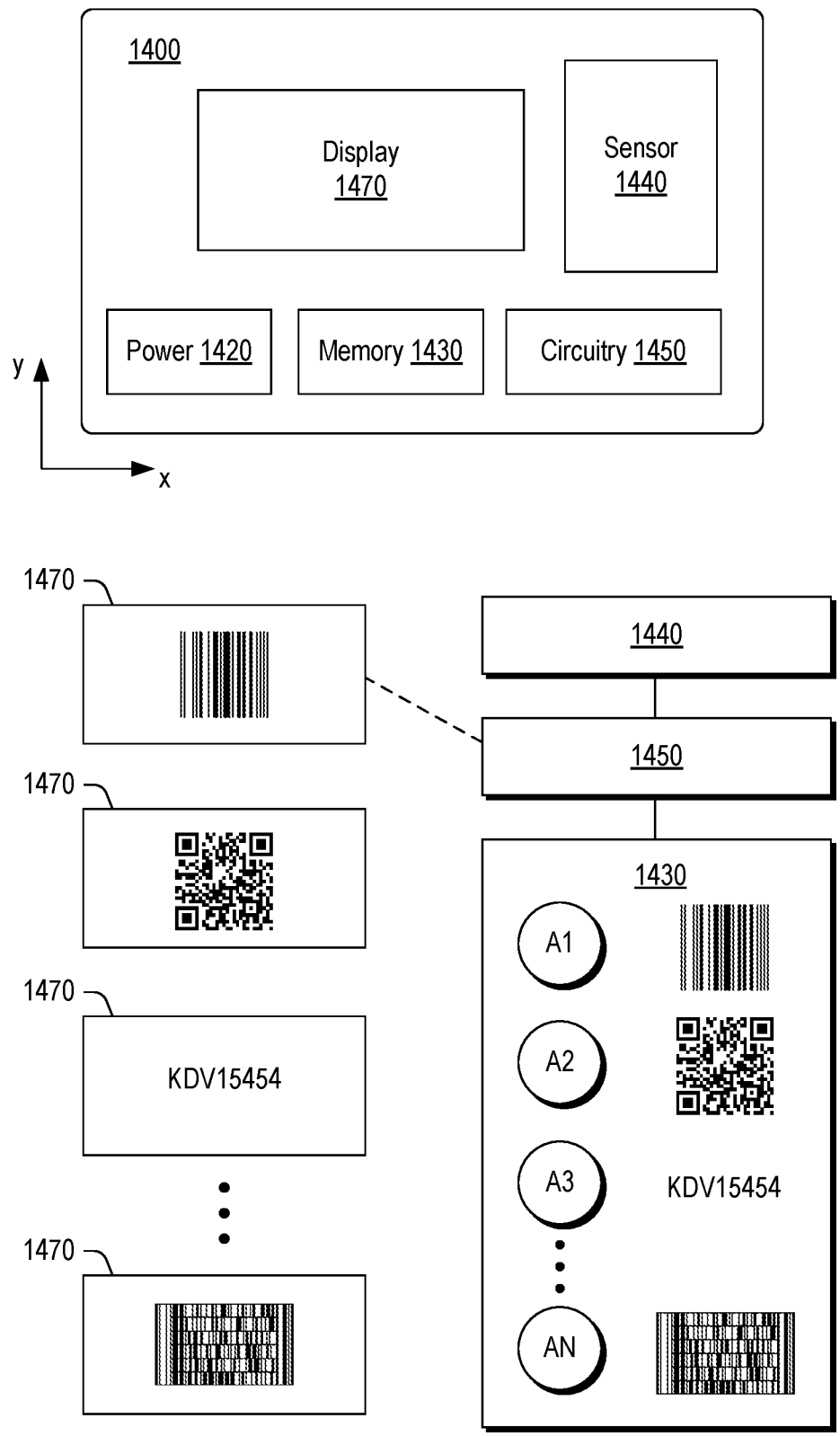
FIG. 14 is a diagram of an example of a device and examples of graphics.

FIG. 14 shows an example of a device 1400 that includes a power source 1420, memory 1430, a sensor 1440, circuitry 1450 and a display 1470. In the example of FIG. 14, the memory 1430 may store information; the sensor 1440 may sense information; the circuitry 1450 may authenticate sensed information (e.g., authentication circuitry); and the display 1470 may output information, for example, based at least in part on a portion of stored information responsive to authentication of sensed information.

As shown in the example of FIG. 14, the memory 1430 may include information A1, A2, A3, . . . . AN. As an example, such information may be associated with one or more graphics. For example, the information A1 may be associated with a bar code (e.g., a universal product code "UPC"), the information A2 may be associated with a quick response code (e.g., a "QRC"), the information A3 may be associated with a numeric or alphanumeric code, etc.

As mentioned, where memory of a device stores multiple tokens, as an example, the device may switch between tokens (e.g., select one of the multiple tokens) via a navigation mechanism. Thus, in the example of FIG. 14, A1, A2, A3, . . . . AN may represent tokens. In such an example, authenticating a fingerprint more than once within a period of time (e.g., about a few seconds) may cause a pointer to increment from one token to another token where, for example, after each authentication information associated with a different token may be rendered to the display. As an example, a navigation mechanism may be a button, for example, a touch sensitive mechanism that may sense touches and increment a pointer in response to a touch. In such an example, a prolonged touch or lack of a subsequent touch may act to make a selection as to particular information (e.g., an item in a list, etc.). As an example, a fingerprint sensor may be a navigation mechanism, for example, where the fingerprint sensor may be configured to perform at least one or more functions of a touchpad (e.g., navigation, selection, etc.).

While the example of FIG. 14 illustrates graphics that may be somewhat undecipherable to the human eye, a display may optionally display accompanying information such as account names, etc. that may be more readily understood by a user (e.g., debit card, credit card, driver's license, boarding pass, etc.).

Figure 15:
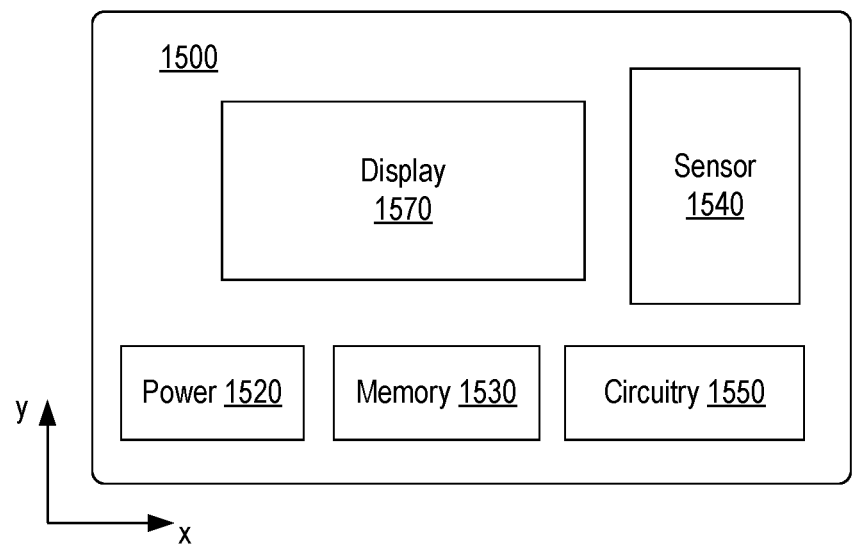
FIG. 15 is a diagram of an example of a device and examples of inputs via a sensor window.
Figure 15:
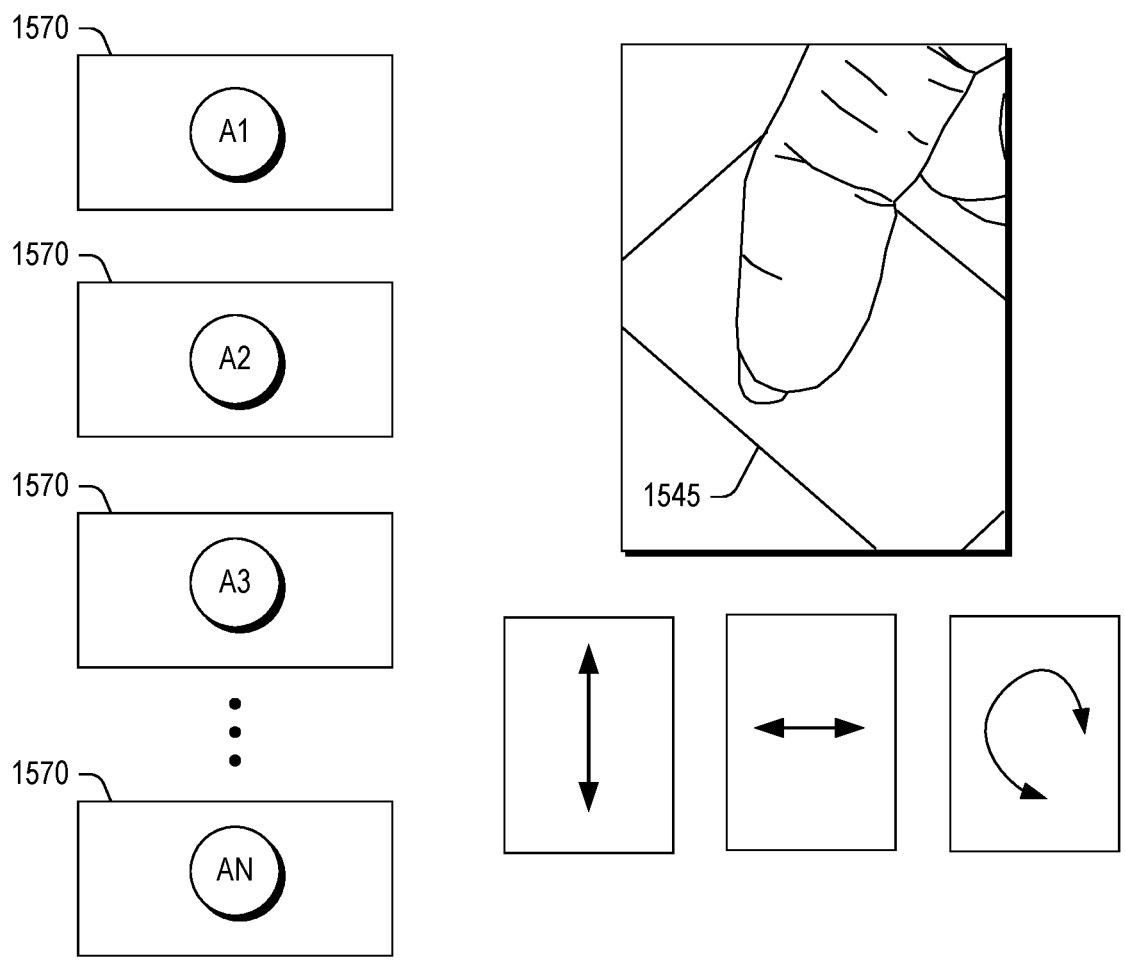

FIG. 15 shows an example of a device 1500 that includes a power source 1520, memory 1530, a sensor 1540, circuitry 1550 and a display 1570. In the example of FIG. 15, the memory 1530 may store information; the sensor 1540 may sense information; the circuitry 1550 may authenticate sensed information (e.g., authentication circuitry); and the display 1570 may output information, for example, based at least in part on a portion of stored information responsive to authentication of sensed information.

In the example of FIG. 15, the memory 1530 may include information A1, A2, A3, . . . . AN, which may be referred to as tokens. As an example, each of such tokens may be associated with one or more graphics. In the example of FIG. 15, the sensor 1540 may include a sensor window 1545 that may be configured to sense input, for example, such as a finger (e.g., at least a portion of a finger such as a flesh portion, a fingernail portion, etc.). For example, a user may contact the sensor window 1545 with a portion of a finger and make a motion that can be sensed by the sensor 1540. In such an example, the sensor 1540 may act in a manner akin to a touchpad (e.g., trackpad) for purposes of navigating, instructing, etc. For example, an up motion or a down motion may be sensed to increment from token A1 to token A2, etc. As an example, a sidewise motion may be sensed to select a token. As an example, a curved motion may act to navigate (e.g., scroll) through a series of tokens.

While various examples of motion are illustrated in FIG. 15, the sensor 1540 may be configured as a button, for example, to increment an index responsive to touch. In such an example, responsive to authentication of a fingerprint by the sensor 1540, the sensor 1540 may function as a button where successive touches navigate through tokens (e.g., consider the tokens A1, A2, A3, . . . . AN). As an example, the display 1570 may display information associated with each of the tokens as they are being navigated.

Figure 16:
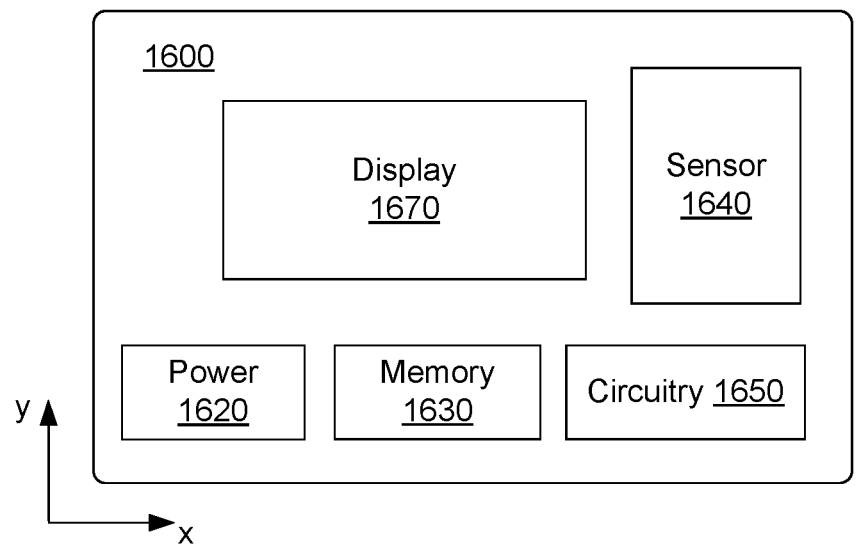
FIG. 16 is a diagram of an example of a device and an example of a method.
Figure 16:
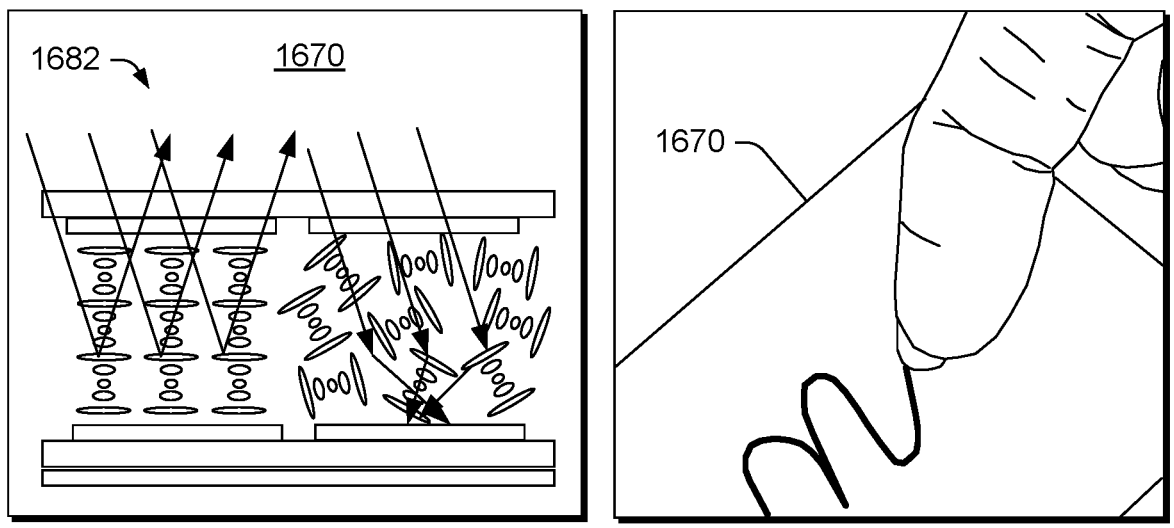
Figure 16:
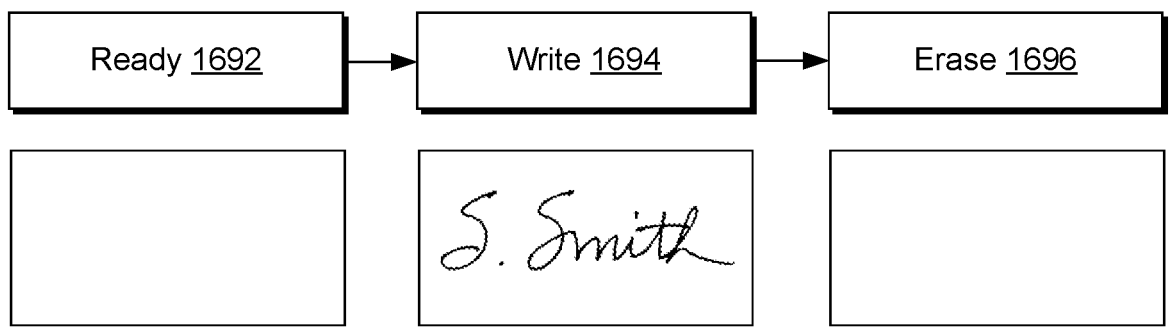

FIG. 16 shows an example of a device 1600 that includes a power source 1620, memory 1630, a sensor 1640, circuitry 1650 and a display 1670. In the example of FIG. 16, the memory 1630 may store information; the sensor 1640 may sense information; the circuitry 1650 may authenticate sensed information (e.g., authentication circuitry); and the display 1670 may output information, for example, based at least in part on a portion of stored information responsive to authentication of sensed information.

In the example of FIG. 16, the display 1670 may be a touch sensitive display that includes touch sensitive circuitry 1682. For example, the display 1670 may include a cholesteric LCD display with associated circuitry. In such an example, the display 1670 may include a cholesteric LCD panel that includes chiral nematic liquid crystals (e.g., chiral nematic liquid crystals, nematic liquid crystals with addition of chiral agent, etc.). Such a display panel may provide for a reflection state and, locally, a non-reflection state. For example, an approximate diagram in FIG. 16 shows a reflection state and a non-reflection or transmission state. As an example, application of force via finger, a stylus or other instrument may orient liquid crystals of a cholesteric LCD display panel in a non-reflection or transmission state such that "markings" appear. As an example, electricity may be applied to reorient crystals in a non-reflection state or transmission state to a reflection state (e.g., to "erase" the markings). For example, in the approximate diagram of FIG. 16, the liquid crystals may be disposed between a glass layer and another layer (e.g., glass or other material optionally with an absorption layer) where optically transparent indium tin oxide (ITO) electrodes are also disposed between the glass layer and the other layer to apply electricity to reorient the crystals. As an example, a cholesteric LCD panel may include one or more polymer stabilizers, features for color(s), etc.

FIG. 16 also shows an example of a method 1690 that includes a ready block 1692, a write block 1694 and an erase block 1696. In such an example, the device 1600 may enter a ready state responsive to one or more events (e.g., authentication of a fingerprint, touching the device 1600, etc.). The ready state may act to apply charge to a cholesteric LCD display to erase any existing marks, writing, etc. to thereby prepare the display for writing such as handwriting by a user of the device 1600. In such an example, a user may sign her name on the cholesteric LCD display and then, for example, show the signature to a sales person, a banker, a custodian, etc. As an example, the signature may persist until the device 1600 applies a charge to the cholersteric LCD display to thereby erase the signature.

As an example, a device may include a cholesteric LCD display that is operatively coupled to a fingerprint sensor. In such an example, authentication of a fingerprint read via the fingerprint sensor may cause the device to erase information from the cholesteric LCD display and to commence a time window in which a user may write on the cholesteric LCD display. In such an example, upon expiration of the time window, the device may again erase information from the cholesteric LCD display. As an example, a user may sign his or her name during the time window, for example, for purposes of verification of a signature. For example, the device 1600 may include a permanent signature (e.g., signed in permanent ink) on a surface of the device 1600. As an example, such a surface may be proximate to the display 1670 (e.g., below, above, etc.), which may facilitate a comparison of the permanent signature and the ephemeral signature signed via the cholesteric LCD display.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A card that comprises a thickness in a range from 0.3 mm to 3 mm, the card comprising:
 a processor;
 memory accessible to the processor;
 a display;
 a fingerprint sensor; and
 instructions stored in the memory and executable by the processor to:
  store information for digital cryptocurrency accounts to the memory;
  render an interface to the display for navigation of the digital cryptocurrency accounts and selection of one of the digital cryptocurrency accounts using the fingerprint sensor, wherein at least one of the digital cryptocurrency accounts comprises associated graphics;

responsive to input via the fingerprint sensor, navigate to and select one of the digital cryptocurrency accounts for transfer of ownership of digital cryptocurrency from the selected one of the digital cryptocurrency accounts or for receipt of ownership of digital cryptocurrency by the selected one of the digital cryptocurrency accounts;

using biometric information acquired via the fingerprint sensor, decrypt a private key of a payor stored in the memory of the card, wherein the private key is associated with the selected one of the digital cryptocurrency accounts for transfer of the ownership of the digital cryptocurrency from the selected one of the digital cryptocurrency accounts;

use the decrypted private key to generate a signed message to transfer the ownership of the digital cryptocurrency to an address of a payee; and output the signed message.

2. The card of claim 1, comprising instructions stored in the memory and executable by the processor to restrict the digital cryptocurrency of the signed message to a single use.

3. The card of claim 2 wherein the digital cryptocurrency comprises a single use account and wherein the instructions to restrict the digital cryptocurrency of the signed message to a single use comprise instructions to delete at least a portion of information of the single use account from the memory of the card.

4. A method comprising:

rendering an interface to a display of a card for navigation of the digital cryptocurrency accounts and selection of a digital cryptocurrency account from digital cryptocurrency accounts using a fingerprint sensor of the card, wherein at least one of the digital cryptocurrency accounts comprises associated graphics, and wherein the card comprises a thickness in a range from 0.3 mm to 3 mm;

responsive to input via the fingerprint sensor, navigating to and selecting one of the digital cryptocurrency accounts for transfer of ownership of digital cryptocurrency from the selected one of the digital cryptocurrency accounts or for receipt of ownership of digital cryptocurrency by the selected one of the digital cryptocurrency accounts;

using biometric information acquired via the fingerprint sensor, via a processor of the card, decrypting a private key of a payor stored in memory of the card, wherein the private key is associated with the selected one of the digital cryptocurrency accounts for transfer of the ownership of the digital cryptocurrency from the selected one of the digital cryptocurrency accounts;

using the decrypted private key, generating a signed message to transfer the ownership of the digital cryptocurrency to an address of a payee; and via circuitry of the card, outputting the signed message.

5. The method of claim 4 comprising, via circuitry of the card, restricting the digital cryptocurrency of the signed message to a single use.

6. The method of claim 5 wherein the digital cryptocurrency comprises a single use account and wherein restricting the digital cryptocurrency of the signed message to a single use comprises deleting at least a portion of information of the single use account from the memory of the card.

7. The method of claim 4 wherein the digital cryptocurrency is Bitcoin currency.

8. The method of claim 4 wherein the digital cryptocurrency of the signed message is subjected to a proof-of-work system.

9. The method of claim 4 wherein the outputting the signed message comprises transmitting the signed message to a proof-of-work system wherein the proof-of-work system appends at least one block to a block chain.

10. The method of claim 9, wherein the block chain is a shared public record.

11. The method of claim 4 comprising implementing an Elliptic Curve Digital Signature Algorithm (ECDSA) to generate the digital signature.

12. The method of claim 4 comprising a wallet stored in the memory wherein the wallet comprises at least the private key, wherein the private key is encrypted.

13. The method of claim 4 wherein outputting comprises outputting the signed message to a card reader.

14. The method of claim 13 wherein the card reader transmits the signed message to a network.

15. The method of claim 14 wherein the network is operatively coupled to a proof-of-work system.

16. The method of claim 15 wherein the proof-of-work system validates a transfer of the digital currency of the signed message from the payor to the payee.

17. The method of claim 4 wherein the card comprises timer circuitry that locks the card after a timeout period.

18. The method of claim 17 comprising unlocking the card responsive to authentication of received input via the fingerprint sensor.

19. One or more computer-readable storage media comprising instructions executable by a processor of a card to:

render an interface to a display of a card for navigation of the digital cryptocurrency accounts and selection of a digital cryptocurrency account from digital cryptocurrency accounts using a fingerprint sensor, wherein at least one of the digital cryptocurrency accounts comprises associated graphics, and wherein the card comprises a thickness in a range from 0.3 mm to 3 mm;

responsive to input via the fingerprint sensor, navigate to and select one of the digital cryptocurrency accounts for transfer of ownership of digital cryptocurrency from the selected one of the digital cryptocurrency accounts or for receipt of ownership of digital cryptocurrency by the selected one of the digital cryptocurrency accounts;

using biometric information acquired via the fingerprint sensor, decrypt a private key of a payor stored in memory of the card, wherein the private key is associated with the selected one of the digital cryptocurrency accounts for transfer of ownership of the digital cryptocurrency from the selected one of the digital cryptocurrency accounts;

use the decrypted private key to generate a signed message to transfer the ownership of the digital cryptocurrency to an address of a payee; and output the signed message.

\* \* \* \* \*